(12) United States Patent
Huang et al.

(10) Patent No.: US 11,561,877 B2
(45) Date of Patent: Jan. 24, 2023

(54) INTERACTIVE ELECTRONIC DOCUMENTATION FOR OPERATIONAL ACTIVITIES

(71) Applicants: Tina Huang, San Francisco, CA (US); Andrew Tuan Nguyen, San Jose, CA (US); Brett Lazarus, San Francisco, CA (US); Zach Olstein, San Francisco, CA (US); Nina Yang, Millbrae, CA (US); Joseph Berceli-Wain, McMinnville, OR (US); Oliver Ruebener, Oakland, CA (US); Victoria Emerald Tan, Carlsbad, CA (US); David Bushong, Hayward, CA (US)

(72) Inventors: Tina Huang, San Francisco, CA (US); Andrew Tuan Nguyen, San Jose, CA (US); Brett Lazarus, San Francisco, CA (US); Zach Olstein, San Francisco, CA (US); Nina Yang, Millbrae, CA (US); Joseph Berceli-Wain, McMinnville, OR (US); Oliver Ruebener, Oakland, CA (US); Victoria Emerald Tan, Carlsbad, CA (US); David Bushong, Hayward, CA (US)

(73) Assignee: Transposit Corporation, San Francisco, CA (US)

( * ) Notice: Subject to any disclaimer, the term of this patent is extended or adjusted under 35 U.S.C. 154(b) by 0 days.

(21) Appl. No.: 17/185,726

(22) Filed: Feb. 25, 2021

(65) Prior Publication Data
US 2021/0279160 A1   Sep. 9, 2021

Related U.S. Application Data

(60) Provisional application No. 63/129,722, filed on Dec. 23, 2020, provisional application No. 62/981,148, filed on Feb. 25, 2020.

(51) Int. Cl.
*G06F 11/32* (2006.01)
*G06F 11/07* (2006.01)
(Continued)

(52) U.S. Cl.
CPC .......... *G06F 11/326* (2013.01); *G06F 3/0482* (2013.01); *G06F 3/0483* (2013.01); *G06F 11/0781* (2013.01); *G06F 16/93* (2019.01)

(58) Field of Classification Search
CPC ......... G06F 11/30–3495; G06F 3/0482; G06F 3/0483; G06F 11/0781; G06F 16/93
See application file for complete search history.

(56) References Cited

U.S. PATENT DOCUMENTS 8,533,608 B1 * 9/2013 Tantiprasut ............ G06Q 10/06
                                                              715/751
8,756,301 B2 * 6/2014 Ennis ...................... H04L 41/00
                                                              709/223
(Continued)

FOREIGN PATENT DOCUMENTS

WO        2019144096         7/2019
WO     WO-2021173858 A1      9/2021

OTHER PUBLICATIONS

"International Application Serial No. PCT US2021 019707, International Search Report dated May 11, 2021", 2 pgs.
(Continued)

*Primary Examiner* — Matthew J Brophy
(74) *Attorney, Agent, or Firm* — Schwegman Lundberg & Woessner, P.A.

(57) ABSTRACT

Various embodiments support or provide for interactive electronic documentation (or an electronic document) for operational activities associated with a system or service, such as one monitored or maintained by a system administrator or engineer. In particular, some embodiments provide
(Continued)

for an interactive electronic document associated with a runbook, which can comprise a set of actions (e.g., list of operations, procedures, steps, and the like) to be performed with respect to a system or service in connection with an operational event, such as a system/service incident, scheduled maintenance, or a support operation.

20 Claims, 28 Drawing Sheets

(51) Int. Cl.
  *G06F 16/93* (2019.01)
  *G06F 3/0482* (2013.01)
  *G06F 3/0483* (2013.01)

(56) References Cited

U.S. PATENT DOCUMENTS

| | | | | |
|---|---|---|---|---|
| 9,386,041 | B2* | 7/2016 | Carver | H04L 41/0816 |
| 9,807,120 | B2* | 10/2017 | Carver | H04L 41/0816 |
| 9,819,547 | B2* | 11/2017 | Maini | H04L 47/41 |
| 9,891,971 | B1* | 2/2018 | Kuhhirte | G06F 11/0709 |
| 10,051,010 | B2* | 8/2018 | Carver | H04L 63/20 |
| 10,284,437 | B2* | 5/2019 | Scallan | H04L 41/40 |
| 10,693,758 | B2* | 6/2020 | Puri | H04L 43/08 |
| 10,771,479 | B2* | 9/2020 | Shahbaz | H04L 63/1416 |
| 11,258,693 | B2* | 2/2022 | Puri | H04L 41/0604 |
| 11,271,795 | B2* | 3/2022 | Bhalla | H04L 41/0895 |
| 2015/0012635 | A1* | 1/2015 | Ennis | G06N 5/02 709/223 |
| 2015/0188768 | A1* | 7/2015 | Maini | H04L 47/41 709/224 |
| 2015/0365438 | A1* | 12/2015 | Carver | H04L 63/1441 726/1 |
| 2016/0308910 | A1* | 10/2016 | Carver | H04L 63/1416 |
| 2018/0097847 | A1* | 4/2018 | Carver | H04L 63/1416 |
| 2019/0097909 | A1* | 3/2019 | Puri | H04L 43/08 |
| 2020/0259700 | A1* | 8/2020 | Bhalla | H04L 41/16 |
| 2020/0328961 | A1* | 10/2020 | Puri | H04L 43/16 |
| 2021/0191769 | A1* | 6/2021 | Eschinger | G06F 11/1464 |
| 2021/0333953 | A1* | 10/2021 | Fitzgerald | G06F 3/04847 |

OTHER PUBLICATIONS

"International Application Serial No. PCT US2021 019707, Written Opinion dated May 11, 2021", 8 pgs.

"International Application Serial No. PCT/US2021/019707, International Preliminary Report on Patentability dated Sep. 9, 2022", 10 pgs.

* cited by examiner

INTERACTIVE ELECTRONIC DOCUMENTATION FOR OPERATIONAL ACTIVITIES

CROSS REFERENCE TO RELATED APPLICATIONS

This application claims priority benefit of U.S. Provisional Application No. 62/981,148 entitled "AUTOMATED AND INTERACTIVE DOCUMENTATION FOR DEVELOPMENT OPERATION ACTIVITIES" and filed on Feb. 25, 2020, and priority benefit of U.S. Provisional Application No. 63/129,722 entitled "RUNBOOK BUILDER" and filed on Dec. 23, 2020, the entire contents of each being incorporated herein by reference.

TECHNICAL FIELD

The present disclosure relates generally to electronic documentation components, and, more particularly, various embodiments described herein provide for systems, methods, techniques, instruction sequences, and devices that relate to interactive documentation for operational activities, such as one or more operations described by a runbook for handling a detected issue of a monitored system or software service.

BACKGROUND

Maintaining operation of computer systems and software services, such as servers and cloud services they provide, usually involves a user (e.g., administrator or system engineer) monitoring such systems and services. The monitoring often involves the user performing operational activities with respect to the systems and services. Examples of such operational activities include, without limitation, development operation (DevOp) and Information Technology (IT) operations/functions, which can be performed by the user.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIGS. 7 through 13 illustrate example graphical user interfaces relating to accessing or using an interactive electronic document for a runbook, according to some embodiments.

FIGS. 14 through 26 are screenshots illustrating example graphical user interfaces relating to accessing or using an interactive electronic document for a runbook through a software tool for team-based communication, according to some embodiments.

DETAILED DESCRIPTION

Figure 1:
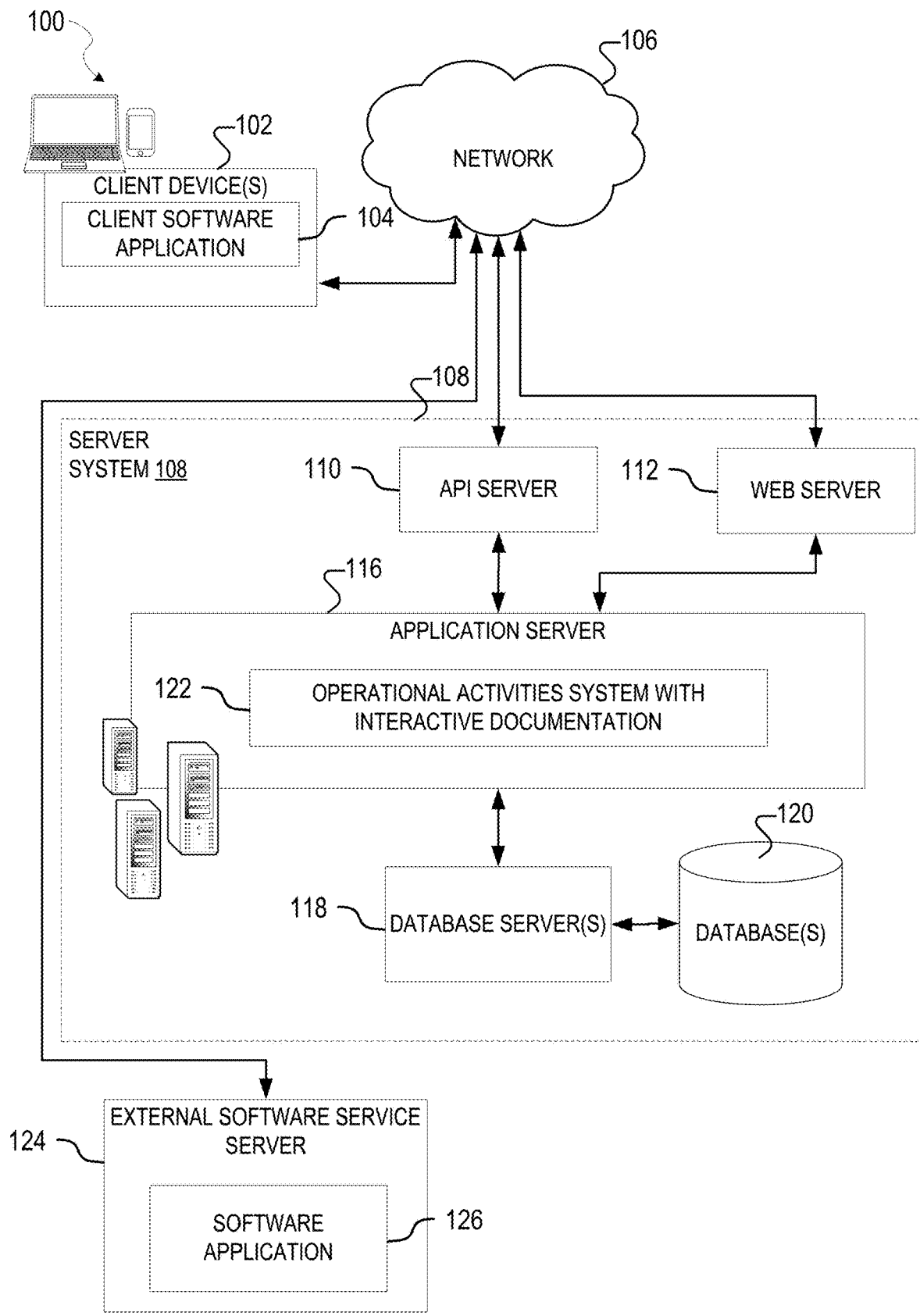
FIG. 1 is a block diagram showing an example data system that includes an operational activities system with interactive documentations, according to some embodiments.

Various embodiments described herein support or provide for interactive electronic documentation (or an electronic document) for operational activities associated with a system or service, such as one monitored or maintained by a system administrator or engineer. In particular, some embodiments provide for an interactive electronic document associated with a runbook, which can comprise a set of actions (e.g., list of operations, procedures, steps, and the like) to be performed with respect to a system or service in connection with an operational event, such as a system/service incident, scheduled maintenance, or a support operation. The set of actions described herein can be user invoked (e.g., performed or executed based on a user selection) through the interactive electronic document or automatically invoked (e.g., automatically performed or executed based on a condition of the runbook or the interactive electronic document). For some embodiments, an automated or interactive process (e.g., on a runbook system) can collect and capture operational activity (e.g., development operation or information technology activity), which can enable a user to interact with an interactive electronic document such that the interactions facilitate execution of one or more actions (with respect to one or more associated systems or services) and such that the interactive electronic document can be updated with information (e.g., a real-time timeline actions performed or invoked by the user through the interactive electronic document) based on the interactions. For instance, various embodiments receive (e.g., capture), event data (e.g., alert or error described in a system/service log file) from one or more different systems or services, where the event data can be used to update, and enable user interaction of, elements (e.g., graphical elements) displayed on an interactive electronic document.

For some embodiments, an interactive electronic document can be defined in connection with a runbook, where an instance of the runbook can be automatically generated in response to each occurrence of an operational event (e.g. system incident, scheduled maintenance, support operation, and the like) that relates to the runbook, and a user can interact with the instance of the runbook through an interactive electronic document generated for the instance of the runbook. For example, assume that a runbook defines an interactive electronic document for addressing/resolving (e.g., troubleshooting) a "Web 500 Error" in connection with a web service, and a first web service and a second web service each separately experience an incident of this error. In this example, an embodiment can generate a first copy of the interactive electronic document (that a user can use) to address/resolve the incident of the "Web 500 Error" for the first web service, and generate a second (separate) copy of the interactive document (that a user can use) to address/resolve the "Web 500 Error" for the second web service. In this way, an embodiment can generate and maintain a separate copy of the interactive electronic document for each occurrence of an operational event (e.g., "Web 500 Error" incident).

According to various embodiments, an interactive electronic document for operational activities is defined into one or more actions (e.g., interactive operations, procedures, steps), where one or more of those actions can each have a separate page/section (e.g., multi-modal page) of documentation that a user can access and navigate between. For instance, action events can include restart server/service, increase number of servers/service instances, and obtain dashboard for a server/service. Some embodiments cause an action to be performed with respect to an external system or service via Application Program Interfaces (APIs) (e.g., pluggable APIs for that external system or service). For example, one or more APIs can be relationally composed together by logic (e.g., as defined using a computer language, such as JavaScript or Standard Query Language (SQL)) to form an operation that abstracts details of the composition, such as details relating to one or more API calls being made in the composition to implement the logic of the operation. In doing so, a set of actions performed by the operation can abstract away and handle complexities of using different APIs by different third-party providers, such as complexities relating to authentication, retries, caching, data formatting, pagination, filtering, joining different data sources (e.g., combining data across multiple APIs), optimized execution, and the like. The operation's logic can use data connector operators to effectively make a plurality of component calls (e.g., third-party API calls) and aggregate data from those component calls to generate a desired result for the client software application, while the software component environment seamlessly manages technicalities of those component calls, such as authentication, to access the component calls using a plurality of different user account credentials or keys (e.g., API keys).

By enabling an action to be performed through (or by) an interactive electronic document (e.g., for a runbook), some embodiments can collect data on how a copy of the interactive electronic documents is being used with respect to one or more operational events (e.g., in connection with the runbook). For some embodiments, an interactive electronic document for operational activities can be configured to be displayed through a third-party software tool or platform, such as an integrated development environment (IDE) or a communications platform (e.g., SLACK), which can enable a user to use the third-party tool/platform for navigating between one or more pages/sections of the interactive electronic document and for interacting with the interactive electronic document. For example, a user can access a copy of an interactive electronic document of a runbook through a SLACK channel, where the SLACK channel can be autogenerated in association with the runbook.

Further, some embodiments provide a pluggable architecture that enables one or more portions of interactive electronic document to be configured with automated actions (e.g., executable code or scripts) that can be executed in the background (e.g., on a backend system) while being accessible/invoked via one or more graphical user interface elements (e.g., buttons or forms) displayed as part of the interactive electronic document or a third-party software tool/platform (e.g., a communication platform, such as SLACK) accessing the interactive electronic document. User access/invocation of automated actions through an instance of an interactive electronic document of a runbook can enable some embodiments to capture data on how one or more users interact with the runbook. Over time, this captured data can allow some embodiments to automatically suggest improvements to operation activities facilitated (e.g., invoked) by an interactive electronic document (e.g., of a runbook). For instance, as a user navigates through an interactive electronic document, such navigation events can be captured during user interaction. Examples of navigation events can include, without limitation, navigating between pages or sections of the interactive electronic document, searching for a runbook from the current runbook, navigating to another runbook from the current runbook, or closing the current runbook.

For some embodiments, an interactive electronic document described herein provide a flow of information that comprises a feedback loop where: user interactions with a runbook through the interactive electronic document (e.g., interactions with buttons or forms presented by the interactive electronic document) result in generation of event data (e.g., by an external system or service); and event data is analyzed and suggested improvements are generated for the runbook (e.g., new operations/steps/procedures for a runbook, or suggested actions for a runbook).

An interactive electronic document described herein can be generated based on a static document for a runbook. For instance, a single static document can be converted into an interactive electronic document that comprises one or more multi-modal pages for display through a third-party software tool, e.g., such as IDE or a communication system (e.g., SLACK). The following figure illustrates an example multi-modal page. Examples of multi-modal pages are illustrated herein with respect to FIGS. 15, 16, 18, 19, 21, 24 and 26.

For some embodiments, an interactive electronic document described herein can be implemented using a markup language, which can enable the interactive electronic document to be accessed through common development/IT tools, such as integrated development environments (IDEs), text editors, and communications platforms (e.g., SLACK). For instance, the markup language can bind markdown data content to one or more actions (e.g., actions of a runbook). The markup language can comprise markdown syntax that links and binds the document to metadata. As also used herein, markdown data content can comprise text written in accordance with a version of markdown language (e.g., written using syntax defined by a version of markdown language).

As used herein, examples of operational activity can include, without limitation, troubleshooting, performing a root cause analysis (RCA), performing diagnostic testing, performing maintenance, and performing technical support with respect to a system or a service. Examples of an operational event can include, without limitation, execution of an action (e.g., procedure, step, operation, and the like) with respect to a system or service, a status update of an executed action, detecting an alarm, an alert, an error, or a warning generated by a system or service, receiving a request for technical support, detecting that a system or service is going offline, and the like.

As used herein, a runbook can comprise a listing or compilation of one or more actions, routines, operations, or workflows that a user, such as a system administrator, could use or have performed with respect to one or more computer systems. For instance, a user could use a runbook used with a computer system for information technology (IT), development operations (DevOps), maintenance, or troubleshooting purposes. An example runbook could include, for instance, one that comprises a list (e.g., ordered list) of actions/routines/procedures/operations that can be performed to resolve a detected issue with respect to a computer system. Another example runbook can comprise a list (e.g., ordered list) of actions/routines/procedures/operations that can be performed to satisfy a user request (e.g., username or password reset, adding a new device to a network, adding a new service to a network, and the like). A given runbook can be generated for a specific purpose (e.g., issue or request) for a system or service, and can be generated based on an issue/request that was previously observed, that is previously observed and resolved, or that could potentially occur in the future. Once a runbook for a specific purpose is generated, the runbook can be updated as new aspects are observed or encountered. Conventional runbooks are typically generated by a user, such as an administrator or a system engineer (e.g., of a technical support or IT department) involved in monitoring the system or the service.

As used herein, runbook instance data can refer to data describing an instance of a runbook generated based on a definition for the runbook, and the runbook instance data can store data collected in connection with the instance of the runbook. For some embodiments, for a specific instance of the runbook, runbook instance data stores operational activities data collected in connection with the specific instance of the runbook, such as actions taken through or by an interactive electronic document for the specific instance of the runbook, or data (e.g., event or log data) collected from one or more monitor systems/services in connection with the specific instance of the runbook. Depending on the embodiment, the runbook instance for a given instance of a runbook can function/operate as a data container for that given instance.

As used herein, a definition for an interactive electronic document (e.g., interactive document definition) can be used as a template for generating individual instances (e.g., copies) of the interactive document in connection with individual operational events (e.g., individual incidents or events that would trigger use of a runbook). An individual interactive document definition can be associated with an individual runbook, and for each single instance of the individual runbook generated, the individual interactive document definition can be used to generate an interactive electronic document for a user to interact with the single instance of the runbook, with the interactive electronic document displaying information relating specifically to the single instance of the runbook.

As used herein, an interactive electronic document can include data that can be accessed by a client device and cause presentation of a graphical user interface at the client device, where the graphical user interface can present information regarding operational activities relating to one or more external systems or services, where the information can be updated (e.g., in real-time) as a user is viewing the graphical user interface, and where the graphical user interface can enable a user at the client device to invoke one or more actions with respect to one or more external systems or services. Examples of interactive electronic document can include, without limitation, document data that comprises Hypertext Markup Language (HTML), scripting language (e.g., JavaScript), markup language, and the like. Depending on the embodiment, the interactive electronic document can be accessed by a variety of software tools on a client device, such as an Internet browser, a communications tool (e.g., SLACK), an IDE, and the like.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes an operational activities system 122 with interactive documentations (hereafter, the operational activities system 122), according to some embodiments. By including the operational activities system 122, the data system 100 can support or provide for interactive electronic documentation (or an electronic document) for operational activities associated with a system or service, such as one monitored or maintained by a system administrator or engineer. For instance, according to various methodologies described herein, the operational activities system 122 can enable the data system 100 to provide (e.g., enable an server system 108 to provide a client device 102) for an interactive electronic document associated with a runbook, which can comprise a set of actions (e.g., list of operations, procedures, steps, and the like) to be performed with respect to a system or service in connection with an operational event, such as a system/service incident, scheduled maintenance, or a support operation. More regarding features of the operational activities system 122 are illustrated and described herein with respect to FIGS. 2 through 26.

As shown, the data system 100 includes one or more client devices 102, the server system 108, the external software service server 124, and a network 106 (e.g., including Internet, wide-area-network, local-area-network, wireless network, and the like) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106. Additionally, the external software service server 124 can communicate and exchange data with the server system 108 via the network 106. The data exchanged between the client software application 104, between the client software application 104 and the server system 108, and between the server system 108 and the external software service server 124 can include, without limitation, data objects, requests (e.g., API calls), responses (e.g., API responses), public/private keys (e.g., API keys), hash values, access rights data, license data, and authentication data (e.g., authentication tokens).

The external software service server 124 can host a software application 126 that provides a software service, which is external to a computing entity (e.g., the client devices 102 or the server system 108) but accessible by the computing entity over the network 106 via a software component (e.g., an API associated with the software service). For instance, the operational activities system 122 on the server system 108 can access the external software service provided by the external software service server 124, and invoke one or more actions with respect to the external software service, by accessing (e.g., calling) an API at the server system 108. As noted herein, the operational activities system 122 can cause execution (e.g., performance) of a user or automatically invokable action in response to receiving a request from the client device to invoke the action. The external software service server 124 can comprise one or more computing devices that host the software application 126 providing a software service. In this way, the external software service server 124 can support a software service (e.g., AMAZON WEB SERVICES) provided by a third-party organization, such as such as GOOGLE or AMAZON.

The server system 108 provides server-side functionality via the network 106 to the client software application 104. While certain functions of the data system 100 are described herein as being performed by the operational activities system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 provides enhanced data object functionality.

The server system 108 supports various services and operations that are provided to the client device 102 by the operational activities system 122. Such operations include transmitting data from the operational activities system 122 to the client device 102, receiving data from the client device 102 to the operational activities system 122, and the operational activities system 122 processing data generated by the client device 102. This data may include, for example, data objects, requests, responses, public/private keys, hash values, access rights data, license data, and authentication data. Data exchanges within the data system 100 may be invoked and controlled through operations of software component environments available via one or more endpoints, or functions available via one or more user interfaces (UIs) of the client device 102, which may include web-based UIs provided by the server system 108 (e.g., based on the operational activities system 122) for presentation at the client device 102.

With respect to the server system 108, each of an API server 110 and a web server 112 is coupled to an application server 116, which hosts the operational activities system 122. The application server 116 is communicatively coupled to a database server 118, which facilitates access to a database 120 that stores data associated with the application server 116.

The API server 110 receives and transmits data (e.g., API calls, commands, data objects, requests, responses, public/private keys, hash values, access rights data, license data, and authentication data) between the client device 102 and the application server 116. Specifically, the API server 110 provides a set of interfaces (e.g., routines and protocols) that can be called or queried by the client software application 104 in order to invoke functionality of the application server 116 (e.g., functionality of the operational activities system 122). The API server 110 exposes various functions supported by the application server 116 including, without limitation: user registration; login functionality; data object operations (e.g., generating, storing, retrieving, encrypting, decrypting, transferring, access rights, licensing, and the like); interview sessions functionality; business process operations (e.g., starting, generating, and the like); and user communications.

Through one or more web-based interfaces (e.g., web-based UIs), the web server 112 can support various functionality of the operational activities system 122 of the application server 116 including, without limitation: user registration; login functionality; and data object operations (e.g., generating, storing, retrieving, encrypting, decrypting, transferring, access rights, licensing, and the like).

The application server 116 hosts a number of applications and subsystems, including the operational activities system 122, which supports various functions and services with respect to various embodiments described herein.

The application server 116 is communicatively coupled to a database server 118, which facilitates access to database(s) 120 in which may be stored data associated with the operational activities system 122. Data associated with the operational activities system 122 can include, without limitation, definition of a runbook, definition of an interactive electronic document (e.g., for a runbook), metadata (e.g., metadata files or metadata associated with a link of markdown data content), and source code data (e.g., source code files) associated with a software component environment.

Figure 2:
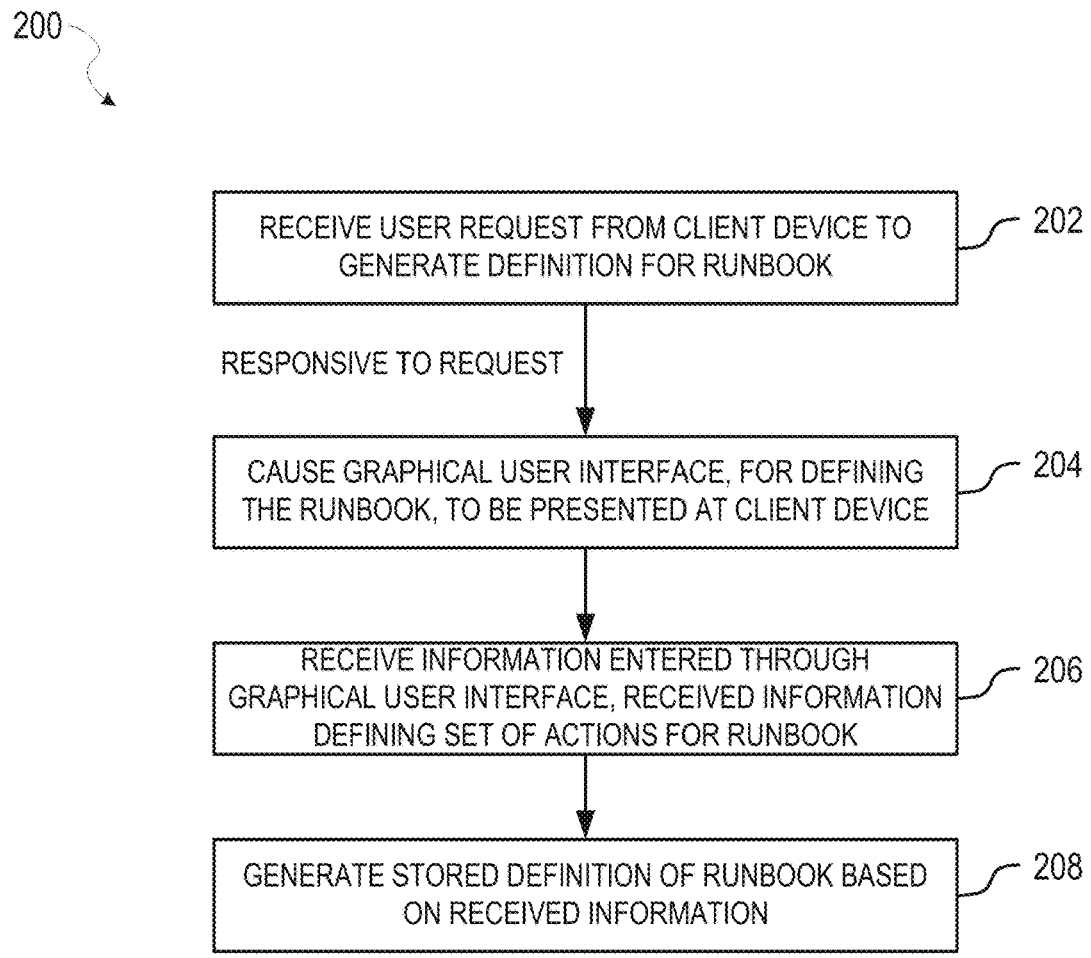
FIGS. 2-3 are flowcharts illustrating example methods for interactive electronic documentation for operational activities associated with a system or service, according to some embodiments.
Figure 3:
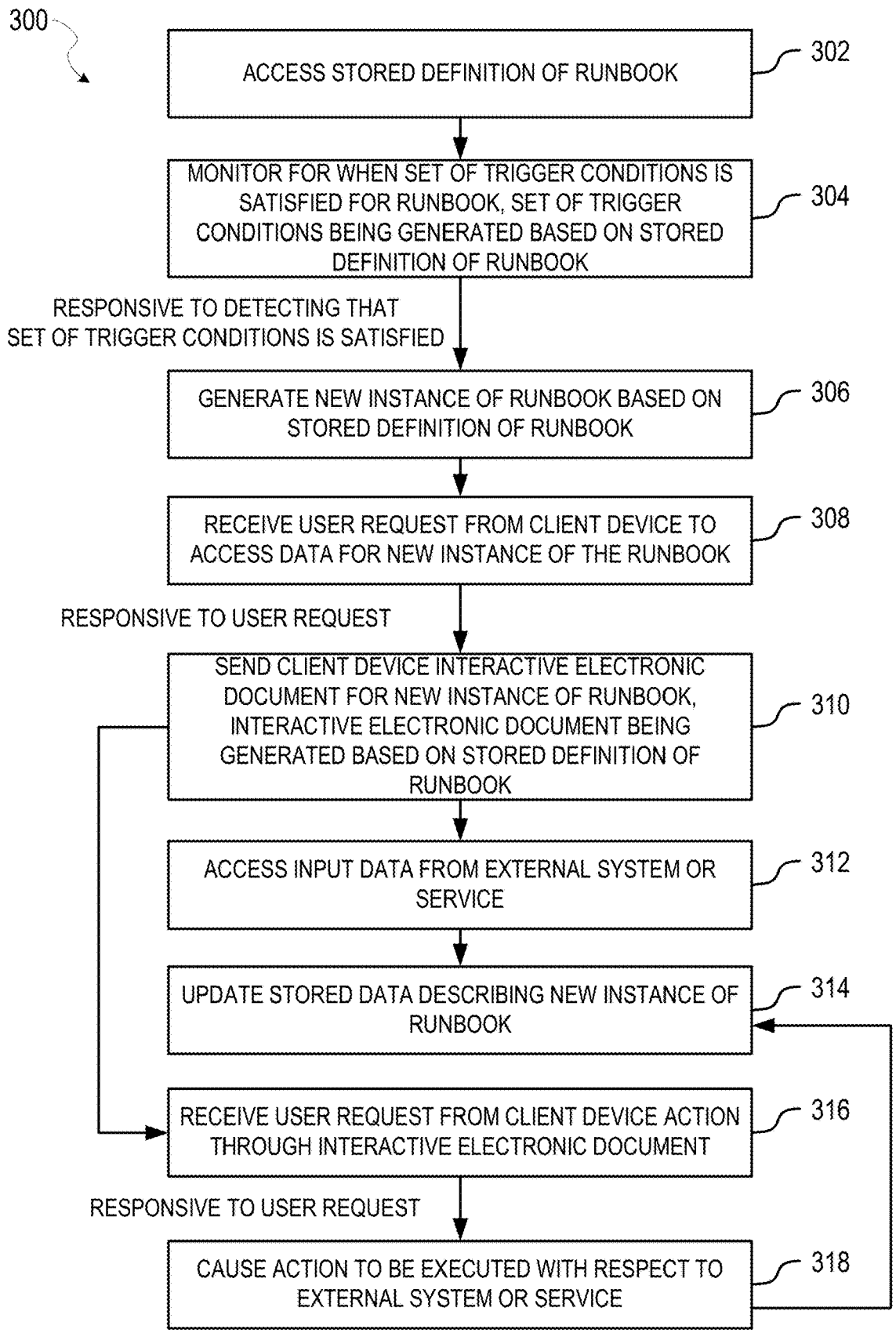

FIGS. 2 and 3 are flowcharts illustrating example methods for interactive electronic documentation for operational activities associated with a system or service, according to some embodiments. It will be understood that example methods described herein may be performed by a machine in accordance with some embodiments. For example, any one of the methods 200, 300 can be performed by the operational activities system 122. An operation of various methods described herein may be performed by a hardware processor (e.g., a central processing unit or graphics processing unit) of a computing device (e.g., a desktop, server, laptop, mobile phone, tablet, and the like), which may be part of a computing system based on a cloud architecture. Example methods described herein may also be implemented in the form of executable instructions stored on a machine-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to the FIG. 2, the method 200 illustrates an example process for generating (e.g., building) a runbook, according to some embodiments. For some embodiments, the method 200 is performed on a server (e.g., the application server 116) by the operational activities system 122. As shown, at operation 202, a processing device (e.g., of the application server 116) receives a user request from a client device (e.g., 102) to generate a definition for a runbook, where the runbook comprises a set of actions with respect to a set of external systems or services (e.g., the external software service server 124).

In response to the user request to generate the definition for the runbook, at operation 204, the processing device (e.g., of the application server 116) causes a graphical user interface, for defining the runbook, to be presented at the client device (e.g., 102). For instance, the graphical user interface can be presented at the client device via a web page (e.g., an HTML document including JavaScript code) provided to (e.g., sent to) the client device.

Eventually, at operation 206, the processing device (e.g., of the application server 116) receives information entered by a user through the graphical user interface presented on the client device (e.g., 102) at operation 204. By way of this received information, various embodiments described herein can build, construct, or otherwise generate a runbook with interactive electronic documentation. In particular, the received information can define the set of actions for the runbook, and the received information can also define a set of trigger conditions that when satisfied causes generation of an individual instance of the runbook. For instance, satisfaction of the set of trigger conditions can represent an occurrence of an operational event associated with the runbook. Accordingly, for some embodiments, each instance of a runbook generated is associated with a different/separate instance of the set of trigger conditions being satisfied. For example, where a set of trigger conditions of a runbook is configured to detect an operational event comprising an offline web server, such a set of trigger conditions can cause a first instance of the runbook to be generated for when a first web server (being monitored) is detected to be offline, and can cause a second (separate) instance of the runbook to be generated for when a second web server (being monitored) is detected to be offline. Accordingly, user interactions with a copy of an interactive electronic document for the first instance of the runbook would involve operational activities specifically relating the first web server, and user interactions with a copy of an interactive electronic document for the second (separate) instance of the runbook would involve operational activities specifically relating the second web server. Depending on the embodiment, the set of trigger conditions can include a user manually invoking execution (e.g., performance or running) of the runbook, which can cause the generation of an instance of the runbook. Additionally, for some embodiments, the set of trigger conditions can include a schedule, which can cause the runbook to be executed (e.g., performed or run) according to the schedule (e.g., periodically or on specific time(s) and date(s)).

The received information can define, in association with an individual action in the set of actions, a graphical element to be rendered as part of an interactive electronic document generated for the individual instance of the runbook when the individual instance is accessed by a user from a client device (e.g., 102). The graphical element can, for instance, indicate a status of the individual action for the individual instance. For example, a graphical element comprising a checkbox can include that the individual action has been caused to be executed (e.g., through the interactive electronic document) or has completed. Additionally, the received information can define a prescribed or suggested order for executing the set of actions of the runbook. For some embodiments, the prescribed/suggested order determines the order in which graphical elements associated with each action, in the set of actions, is presented in an interactive electronic document generated for the individual instance of the runbook. For various embodiments, an interactive electronic document can comprise a set of graphical elements (e.g., buttons, checkboxes, radio options, drop down box, and the like) associated with each action in a set of actions defined for a runbook.

For some embodiments, at least one condition in the set of trigger conditions is based on input data provided by at least one external system or service (e.g., the external software service server 124). For some embodiments, the input data describes an operational event for the at least one external system or service, such as an alert, an error, or a warning generated by a system or service, a system or service incident, scheduled maintenance for the system or service, or a support operation for the system or service. Depending on the embodiment, the input data can be provided by log data (e.g., log file) generated by an external system or service, or the input data can be pushed (e.g., to the operational activities system 122) or pulled from the external system or service (e.g., by the operational activities system 122).

According to some embodiments, an individual action (in the set of actions) can be configured to execute in response to satisfaction of an execution condition. For instance, the execution condition for the individual action can be satisfied when a user input for the individual action is received through a copy of an interactive electronic document generated for the new instance of the runbook. For example, a user can select a graphical element (such as a button presented as part of the interactive electronic document) associated with an individual action. In another instance, the execution condition for the individual action can be satisfied when the new instance of the runbook is generated. For example, the individual action can be automatically executed soon after generation of the new instance of the runbook. For some embodiments, an individual action (in the set of actions of the runbook) can be configured to cause execution of a next action (e.g., one or more next actions) in the set of actions in response to the individual action completing execution. For some embodiments, data output of a prior/previously-executed action can be mapped as data input to an individual action, and data output of the individual action can be mapped as data input to a subsequent (e.g., next) action that is executed. The information for such mapping can be included as part of the definition of the runbook. Additionally, for some embodiments, an individual action (in the set of actions) can be configured to prompt a user for input information when the individual action is executed for the individual instance, where the input information defines a parameter for performing the individual action. For instance, where a user selects execution of an individual action to page another user (e.g., system administrator or specialist) through an interactive electronic document (e.g., of an instance of a runbook generated for an operational event, such as a detected incident), execution of the individual action could cause the user to be prompted for the other user's identity.

At operation 208, the processing device (e.g., of the application server 116) generates a stored definition of the runbook based on the received information (received by operation 206). Once the definition is generated it can be stored on a database (e.g., 120). After an instance of the runbook is generated based on the stored definition, a user (e.g., at the client device 102) can access data related to the instance (e.g., operational event data collected for the instance) via an interactive electronic document that is generated for the runbook (e.g., based on the stored definition) in response to the user requesting the access.

After operation 208, the processing device (e.g., of the application server 116) can monitor when the set of trigger conditions is satisfied for the runbook and, in response to detecting that the set of trigger conditions is satisfied, the processing device can generate a new instance of the runbook based on the stored definition. The new instance of the runbook can comprise data collected for the runbook, such as data describing operational activities relating to the runbook. For instance, data collected for the new instance can include: operational events data being monitored in connection with the runbook (e.g., operational event data that enables evaluation of a condition that causes execution of one or more actions of the runbook); information regarding one or more actions invoked by a user through an interactive electronic document for the runbook; or information regarding one or more actions that are automatically caused to be performed by the runbook (e.g., based on certain conditions).

Referring now to the FIG. 3, the method 300 illustrates an example process for generating a runbook and accessing data for a runbook, according to some embodiments. Like the method 200 of FIG. 2, the method 300 is performed on a server (e.g., the application server 116) by the operational activities system 122. As shown, at operation 302, a processing device (e.g., of the application server 116) accesses a stored definition of a runbook, where the stored definition can be generated based on information received (e.g., by operation 206 of the method 200 of FIG. 2) from a user (e.g., system administrator) through a graphical interface.

At operation 304, the processing device (e.g., of the application server 116) monitors when the set of trigger conditions is satisfied for the runbook. In response to detecting that the set of trigger conditions is satisfied, at operation 306, the processing device (e.g., of the application server 116) generates a new instance of the runbook based on the stored definition. For example, an embodiment described herein can build/construct/generate a runbook for addressing/resolving an incident for "Web 500 Error" (e.g., using the method 200 of FIG. 2) for a web service. In connection with this runbook, an embodiment can monitor for a set of trigger conditions (defined by a stored definition for the runbook) to detect for an incident of the "Web 500 Error" in connection with one or more web services. When the set of trigger conditions is satisfied (e.g., based on input data provided/generated by the one or more web services) with respect to a specific web service, an embodiment can generate a specific (new) instance of the runbook (based on the stored definition for the runbook) in connection with the specific web service. As described herein with respect to operations 308 and 310, when a user (e.g., system administrator or system engineer) desires to access data (e.g., operational activity data collected) for the specific instance of the runbook, a copy of an interactive electronic document for the specific instance can be provided to the user (e.g., sent to the user's client device) and enable the user to interact with the interactive electronic document to use the runbook to address/resolve the incident of the "Web 500 Error" with respect to the specific web service.

The processing device (e.g., of the application server 116), at operation 308, receives a user request from the client device (e.g., 102) to access data (e.g., runbook instance data) for the new instance of the runbook. In response to the user request to access data (e.g., runbook instance data) for the new instance of the runbook, at operation 310, the processing device (e.g., of the application server 116) sends to the client device (e.g., 102) an interactive electronic document (copy of the interactive electronic document) for the new instance of the runbook, where the interactive electronic document is generated based on the stored definition of the runbook. For some embodiments, the interactive electronic document comprises content that can be updated (e.g., at or near real-time) with information relating to operational activity data provided by the at least one external system or service. For instance, if an external system or service indicates that an action (e.g., invoked by a user through the interactive electronic document) is in progress or completed, one or more graphical elements presented by the interactive electronic document can be updated to indicate that the action is in progress or completed.

After the new instance of the runbook is generated (e.g., by operation 306), at operation 312, the processing device (e.g., of the application server 116) accesses input data from (e.g., operational activities data or log data generated by) at least one external system or service (e.g., a monitored web service). The input data can be accessed, for example, from log data retrieved or received (e.g., pushed) from the at least one external system or service. For instance, the input data can describe an operational event for the at least one external system or service, such as an alert, an error, or a warning generated by the at least one external system or service (e.g., the monitored web service). Eventually, based on the input data accessed (at operation 312), at operation 314, the processing device (e.g., of the application server 116) updates stored data (e.g., runbook instance data) that describes the new instance of the runbook accordingly.

After the interactive electronic document (copy of the interactive electronic document) is sent to the client device (e.g., 102), at operation 316 the processing device (e.g., of the application server 116) receives a user request from the client device to invoke at least one action, in the set of actions of the runbook, with respect to an external system or service, where the user request is generated by the user through the interactive electronic document. In response to the user request, at operation 318, the processing device (e.g., of the application server 116) causes the at least one action to be executed with respect to the external system or service. For instance, as the user accessed (e.g., views) a copy of the interactive electronic document from their client device, the user can select one or more graphical elements that causes the client device to generate and send the user request (to invoke the at least one action) from the client device to the processing device (e.g., from the client device 102 to the application server 116), thereby causing the at least one action to be invoked in response to the user request. Eventually, based on the processing device causing the at least one action to be executed (at operation 318), at operation 314, the processing device (e.g., of the application server 116) updates stored data (e.g., runbook instance data) that describes the new instance of the runbook accordingly.

For various embodiments, based on the stored data for the new instance being updated by operation 314, the processing device (e.g., of the application server 116) causes one or more updates for the interactive electronic document to be issued to the client device (e.g., 102). For example, the issued updates can result in updates in one or more portions (e.g., graphical elements) of the interactive electronic document to be modified/changed based on the issued updates (e.g., issued updates that represent a status update for a user-invoked or auto-invoked action of the runbook, or that represent an additional warning or alerts being issued by the at least one external system or service). For some embodiments, the interactive electronic document includes presentation of a timeline of activities performed or observed in association with the new instance of the runbook. For instance, the activities of the timeline can include information regarding execution of any action (in the set of actions of the runbook) in association with the new instance of the runbook.

Figure 4:
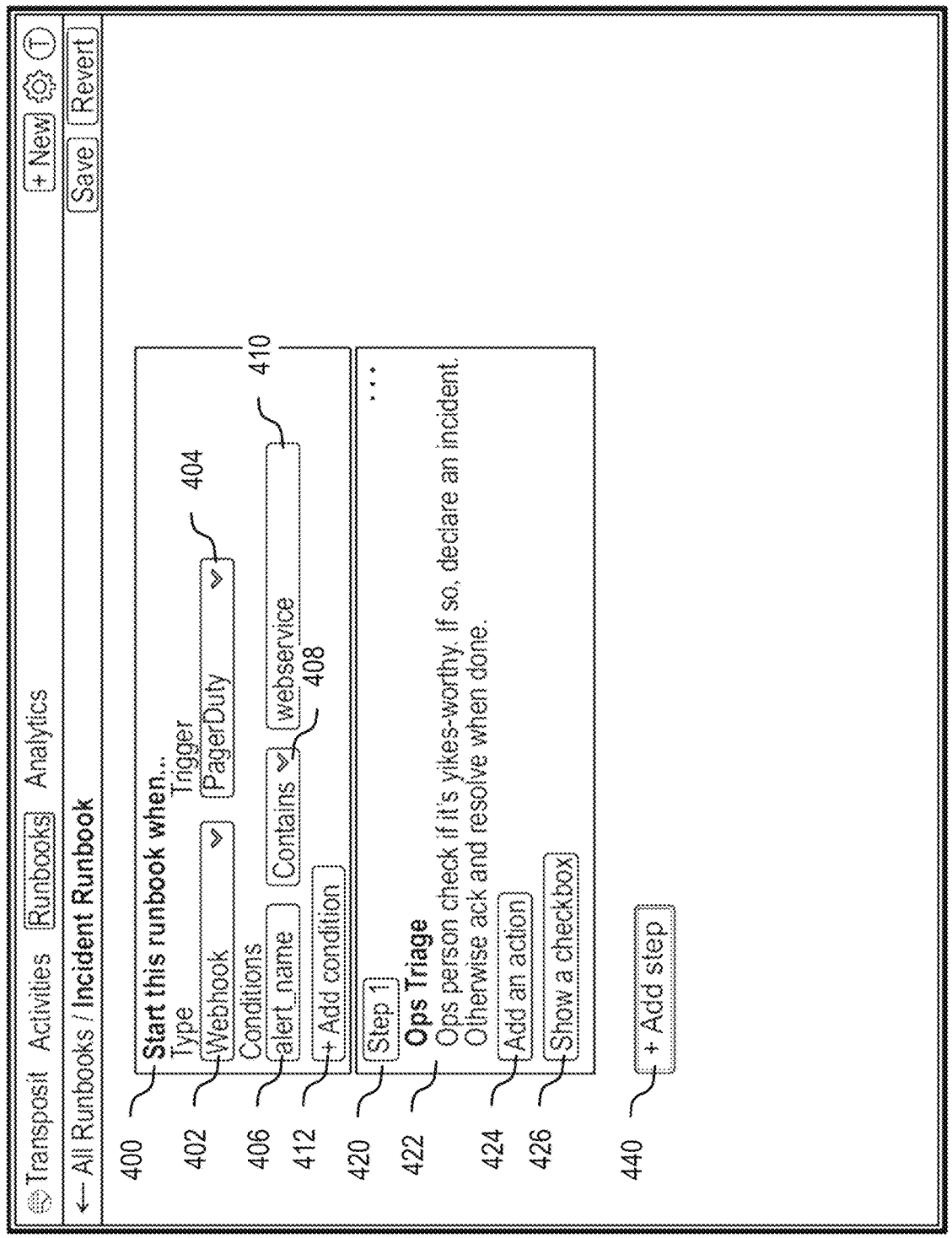
FIGS. 4 through 6 illustrate example graphical user interfaces relating to generating a runbook, according to some embodiments.
Figure 5:
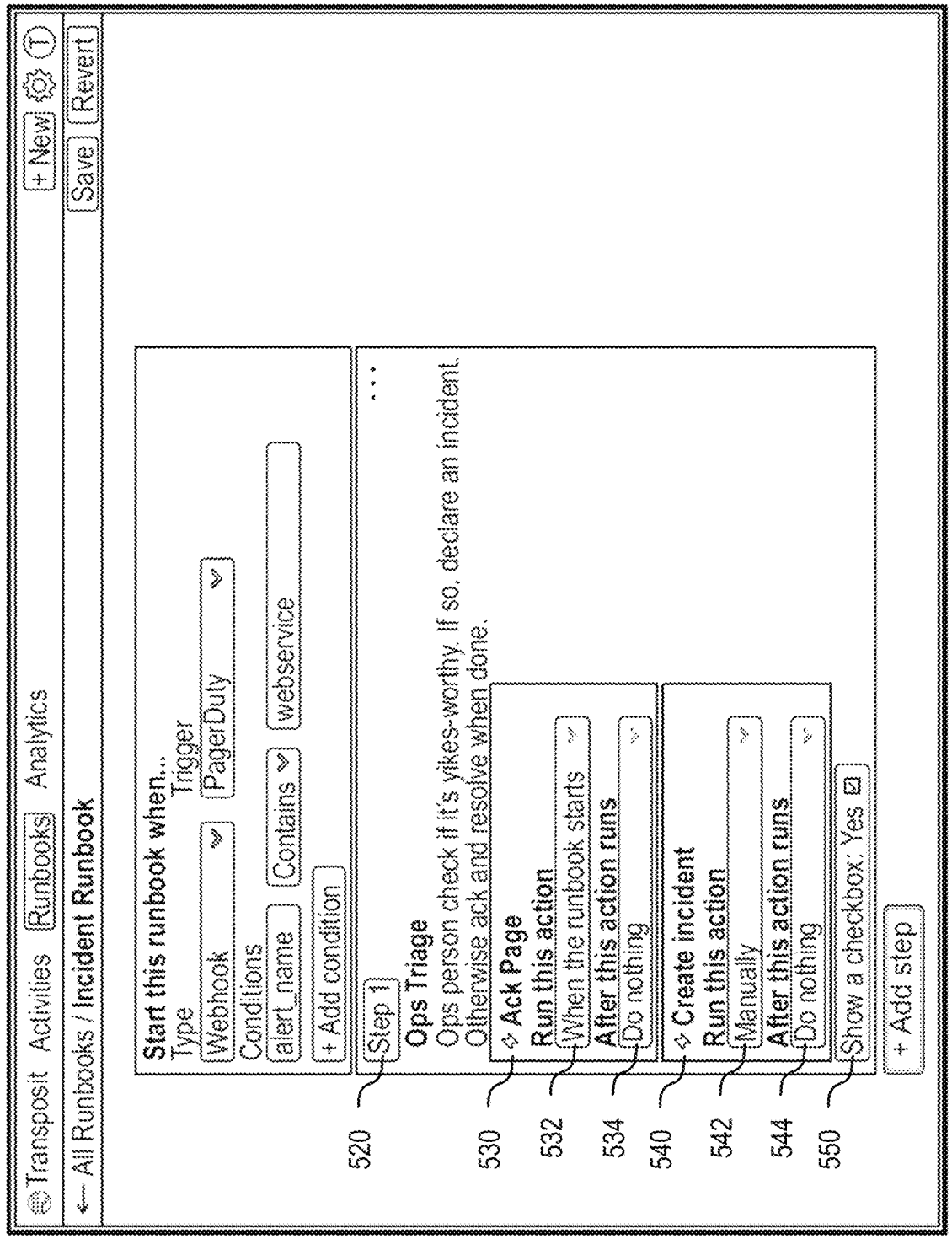
Figure 6:
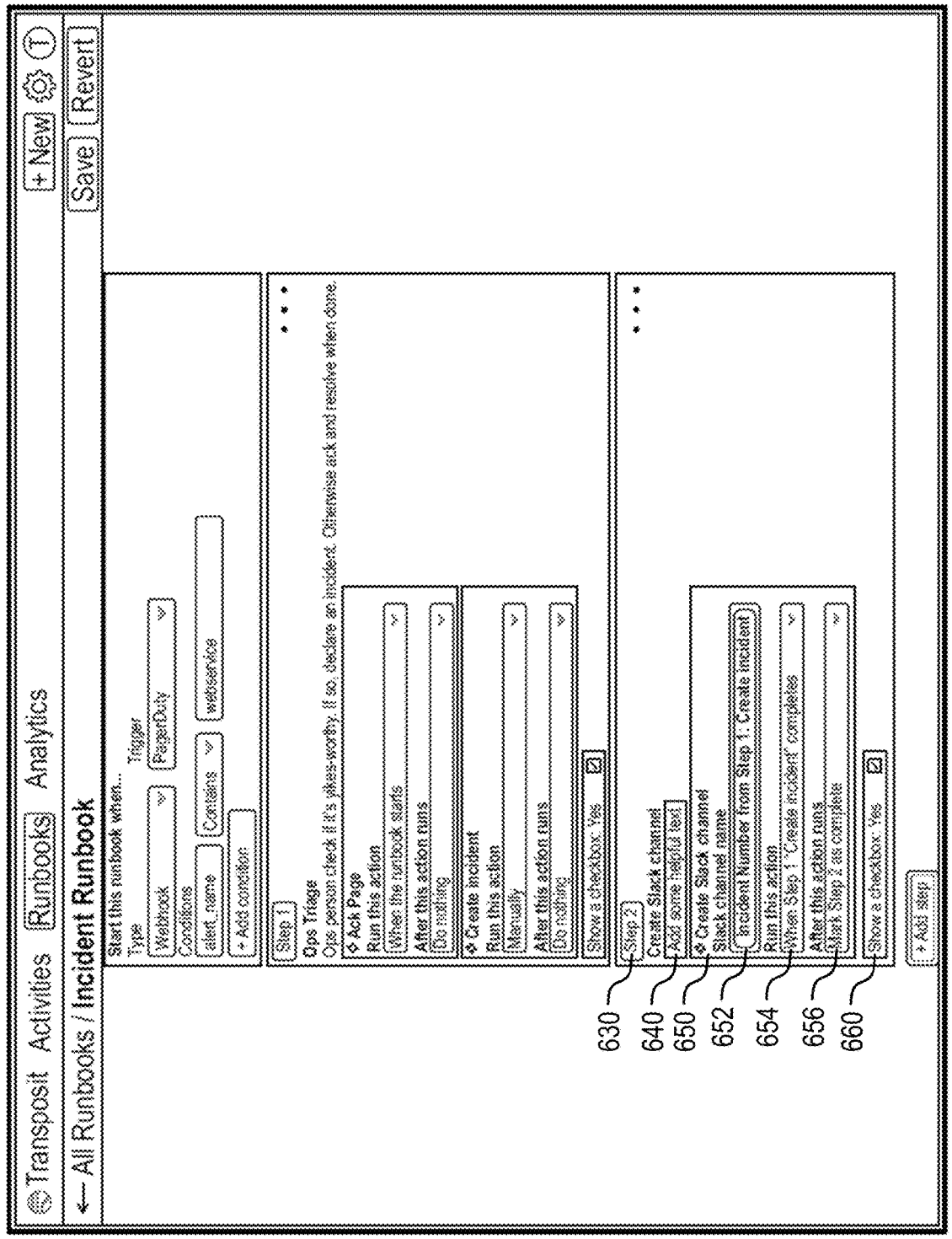

FIGS. 4 through 6 illustrate example graphical user interfaces relating to generating (e.g., building) a runbook, according to some embodiments. In particular, the example graphical user interfaces of FIGS. 4 through 6 illustrate how a user can use an embodiment to build an example runbook by defining steps and parameters for the example runbook. Depending on the embodiment, one or more of graphical user interfaces shown by FIGS. 4 through 6 are generated by one or more operations of the method 200 described with respect to FIG. 2. Additionally, one or more of the graphical user interfaces illustrated by FIGS. 4 through 6 can, for example, be presented on a client device (e.g., 102) via a standalone application (e.g., a runbook standalone application) or a web browser that is accessing a web page of an embodiment.

Referring now to FIG. 4, the example graphical user interface includes a section 400 where a user can define or set one or more parameters (e.g., a set of trigger conditions) for when a new instance of the example runbook would be generated (e.g., via operation 306 of the method 300 of FIG. 3), a section 420 for defining a first step ("Step 1") for the example runbook, and a graphical button 440 that enables the user to add an additional step (e.g., a second step) to the example runbook upon selection. By section 400, the user can define: a trigger type (via field 402); a trigger source (via field 404); a name or label for a condition (or attribute) provided by the trigger source (via field 406); an operator to applied to the condition (via field 408); and a value being applied against the condition by the operator (via field 410). For instance, as shown, the user has defined an example trigger condition where a new instance of the example runbook would be generated when the following condition is satisfied: a condition named/labeled 'alert_name' provided by a PAGERDUTY service, via a webhook (which represents a method of user-defined HTTP callback for a web application or web page), contains a value 'webservice.' Additionally, through graphical button 412 of section 400, the user can add an additional condition (e.g., additional trigger condition) for triggering a new instance of the example runbook.

In section 420, the user can: define (via subsection 422) a textual description for "Step 1" of the example runbook; add (via graphical button 424) one or more actions with respect to "Step 1"; and select (via graphical button 426) whether a graphical checkbox should be included for "Step 1" when presented in an interactive electronic document for an instance of the example runbook, where the graphical checkbox can indicate whether "Step 1" has been completed and where the graphical checkbox can be updated as a result of a user selecting it when presented or updated automatically upon one or more (e.g., all) actions defined for "Step 1" completing execution.

Continuing now to FIG. 5, the illustrated graphical user interface represents the graphical user interface of FIG. 4 after the user has chosen to add two actions to section 520 for "Step 1" of the example runbook: acknowledge page action ("Ack Page") at subsection 530; and create incident action ("Create Incident") at subsection 540. As also shown, the user has selected (via graphical button 550) to show a checkbox for "Step 1." In subsection 530 for the acknowledge page action, the user has selected (via field 532) that the acknowledge page action is caused to be executed (e.g., run) for a new instance of the example runbook when the new instance is generated (which can represent the start of the runbook). Additionally, in subsection 530, the user has selected (via field 534) that nothing further (e.g., no additional action) should be executed after the acknowledge page action has executed. In subsection 540 for the create incident action, the user has selected (via field 542) that the create incident action is caused to be executed (e.g., run) for a new instance of the example runbook in response to a user manually selecting (e.g., invoking) the action through the interactive electronic document. In such an instance, the create incident action can be represented on the interactive electronic document as a graphical element (e.g., a graphical button) that a user can select to manually cause the action to be executed. Also, in subsection 540, the user has selected (via field 544) that nothing further (e.g., no additional action) should be executed after the create incident action has executed. Depending on the embodiment, as a result of a user selecting the graphical button 550, the checkbox shown in an interactive electric document (for a given instance of the example runbook) can be automatically updated (e.g., to show a check in the checkbox) when one or both of the acknowledge page action and the create incident action have been executed with respect to the given instance of the example runbook.

Continuing now to FIG. 6, the illustrated graphical user interface represents the graphical user interface of FIG. 5 after the user has chosen to add another action "Step 2" to the example runbook. In particular, in section 630 for "Step 2," the user can add a textual description for "Step 2" by selecting graphical button 640. As shown, the user has chosen to add one action to section 630 for "Step 2": create SLACK channel action ("Add SLACK Channel") at subsection 650. In subsection 650 for the create SLACK channel action, the user has selected (via field 652) that the name of the SLACK channel to be generated when the action is executed will be based on the incident number provided by "Step 1." In subsection 650, the user has selected (via field 654) that the create SLACK channel action is caused to be executed (e.g., run) for a given instance of the example runbook after "Step 1" is completed for the given instance. Additionally, in subsection 650, the user has selected (via field 656) that after the create SLACK channel action has executed, a checkbox for "Step 2" will be marked as completed (e.g., the checkbox will be shown with a complete). Through graphical button 660, the user has selected to have a checkbox to be shown for "Step 2" in an interactive electric document for a given instance of the example runbook.

FIGS. 7 through 13 illustrate example graphical user interfaces relating to accessing or using an interactive electronic document for a runbook, according to some embodiments. Depending on the embodiment, one or more of graphical user interfaces shown by FIGS. 7 through 13 are generated by one or more operations of the method 300 described with respect to FIG. 3. Additionally, one or more of the graphical user interfaces illustrated by FIGS. 7 through 13 can, for example, be presented on a client device (e.g., 102) via a standalone application (e.g., a runbook standalone application) or a web browser that is accessing a web page of an embodiment.

Figure 7:
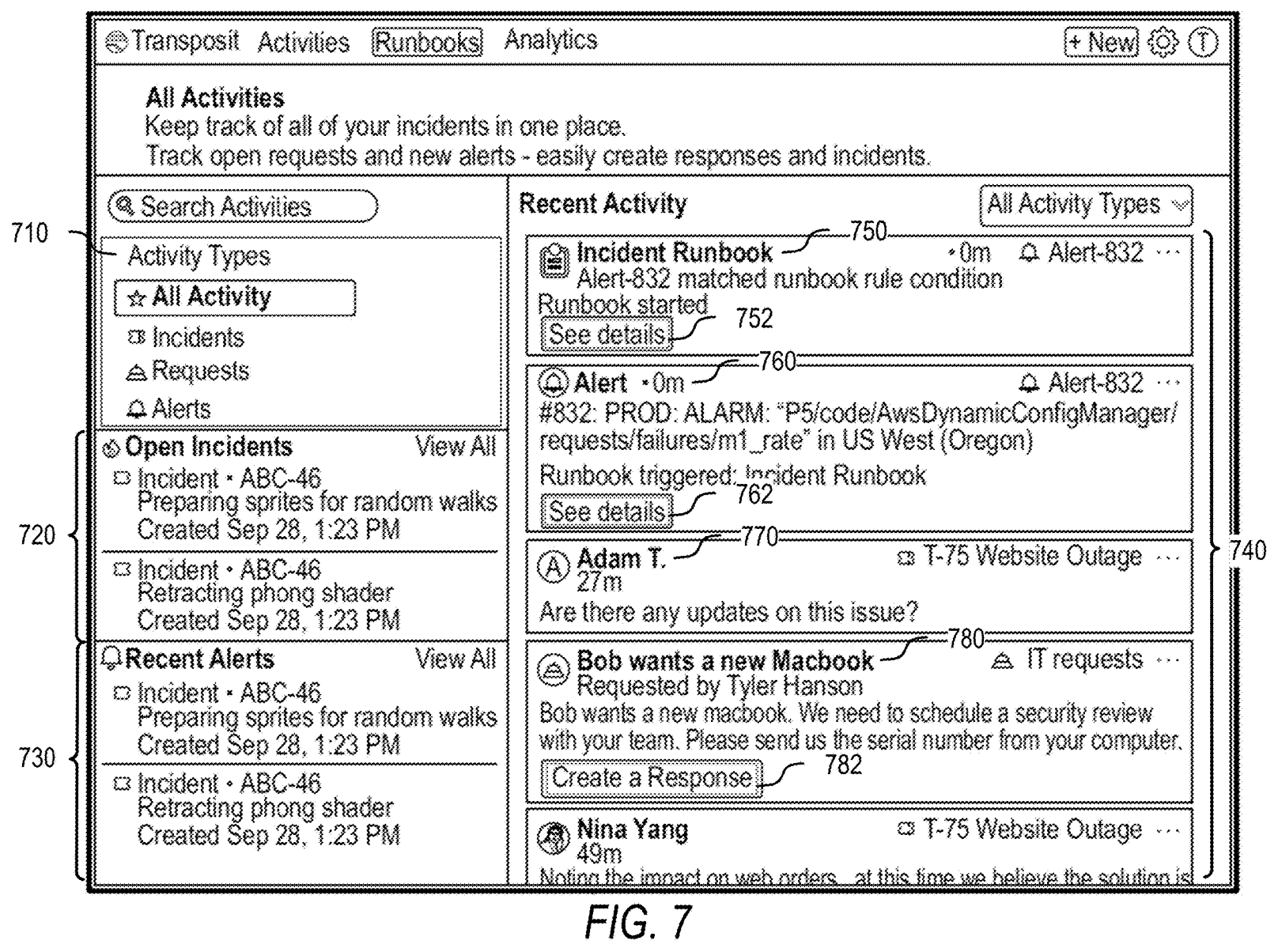

Referring now to FIG. 7, the illustrated example graphical user interface presents an overview or dashboard of activities for (e.g., operational activities relating to) a number of incidents, alerts, requests, and runbook. By section 710, a user can select to filter the type of activity presented by the graphical user interface. Section 720 presents the user some recent incidents that were open (e.g., via an example runbook relating to incidents), a section 730 for recent alerts that were detected, and section 740 for presenting a list of recent activities based on the filter selection by the user via section 710. As shown in section 740, activity 750 represents that an incident runbook (in accordance with various embodiments) was run for "Alert-832" based on the alert matching a set of trigger conditions for the incident runbook. Activity 760 represents the detection of "Alert-832" and that it triggered the incident runbook. The user can select to see more details regarding activity 750 or 760 by selecting either graphical button 752 or graphical button 762 respectively, which could cause the graphical user interface to change accordingly. Activity 770 represents a posted message by a user "Adam T." Activity 780 represents a request submitted by a first user, and includes a graphical button 782 that a second user can respond to.

Figure 8:
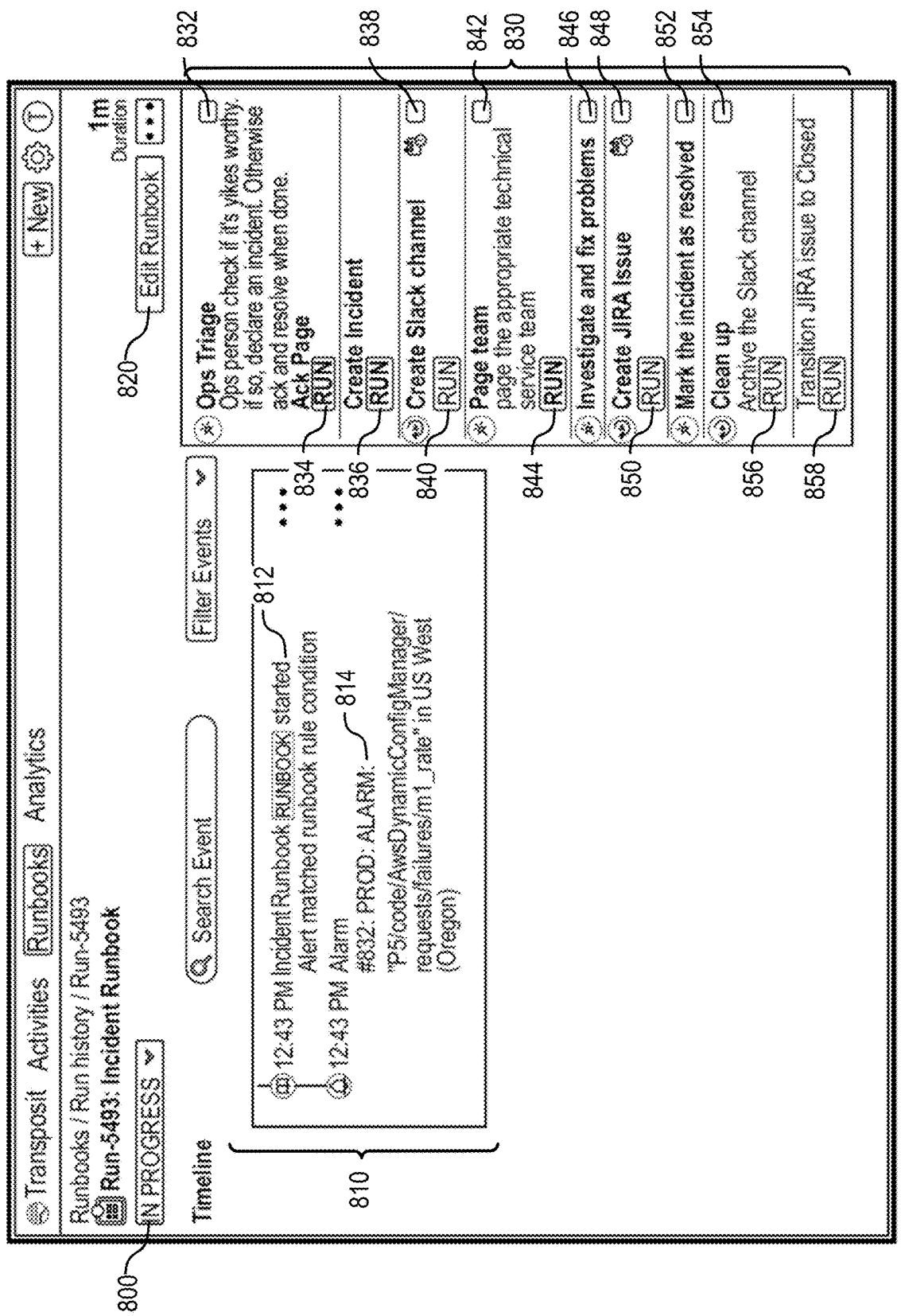

Referring now to FIG. 8, the illustrated example graphical user interface presents a copy of an interactive electronic document generated for an instance (referenced as "Run-5493") of an example runbook (named "Incident Runbook"). In particular, the interactive electronic document illustrated by FIG. 8 was generated in response to satisfaction of a set of trigger conditions by detection of "Alarm #832." The graphical user interface of FIG. 8 can be presented to a user in response to the user requested access to data (runbook instance data) for the instance "Run-5493." As shown, field 800 indicates that the instance "Run-5493" of the "Incident Runbook" is currently in progress. In the event a user wanted to edit a definition of the "Incident Runbook," the user could select the graphical button 820 to "Edit Runbook." For instance, selecting the graphical button 820 could result in a graphical user interface similar to those of FIG. 4, 5, or 6 being presented in connected with the "Incident Runbook."

Section 810 of the graphical user interface presents a timeline of operational activities or events collected or detected in connection with the instance "Run-5493." As shown, a user can search or filter for operational events within the timeline presented by section 810. The timeline of section 810 indicates at 814 that the "Alarm #832" was detected, and thereafter, at 812, the instance "Run 5493" of the "Incident Runbook" was generated in response to the "Alarm #832" matching a set of trigger conditions (e.g., rule condition) defined for the "Incident Runbook."

Section 830 of the graphical user interface presents the multiple steps (e.g., procedures or operations) defined for the "Incident Runbook," with each step representing a different action that is automatically caused to be invoked by the "Incident Runbook" or manually invoked by a user through the graphical user interface of FIG. 8. As shown, the "Ack Page" action of the "Ops Triage" step can be invoked by a user selecting graphical button 834, the "Create Incident" action of the "Ops Triage" step can be invoked by the user selecting graphical button 836, the "Create SLACK Channel" action can be invoked by the user selecting graphical button 840, the "Page Team" action can be invoked by the user selecting graphical button 844, the "Investigate and Fix Problems" step can be selected as completed by selection of checkbox 846, the "Create JIRA Issue" action can be invoked by the user selecting graphical button 850, the "Mark the Incident as Resolved" step can be selected as completed by selection of checkbox 852, the "Archive the Slack Channel" action of the "Clean Up" step can be invoked by the user selecting graphical button 856, and the "Transition JIRA issue to Closed" action of the "Clean Up" step can be invoked by the user selecting graphical button 858. Checkbox 832 can indicate when the "Ops Triage" step has been completed (e.g., automatically updated after each of "Ack Page" action and the "Create Incident" have each been executed at least once), checkbox 838 can indicate when the "Create SLACK Channel" action has completed execution, checkbox 842 can indicate when the "Page Team" action has completed execution (at least once), checkbox 848 can indicate when the "Create JIRA Issue" action has completed execution, and checkbox 854 can indicate when the "Clean Up" step has been completed (e.g., automatically updated after each of the "Archive the Slack Channel" action and the "Transition JIRA issue to Closed" have each been executed). Each of the illustrated checkboxes of the graphical user interface can represent a status that is being maintained by runbook instance data for the instance "Run-5493," and each user selection of executing an action available in section 830 results in an update of the runbook instance data. In this way, user interactions with the interactive electronic document through the graphical user interface can be collected specifically in connection with the instance "Run-5493" and more generally in connection for the "Incident Runbook."

Figure 9:
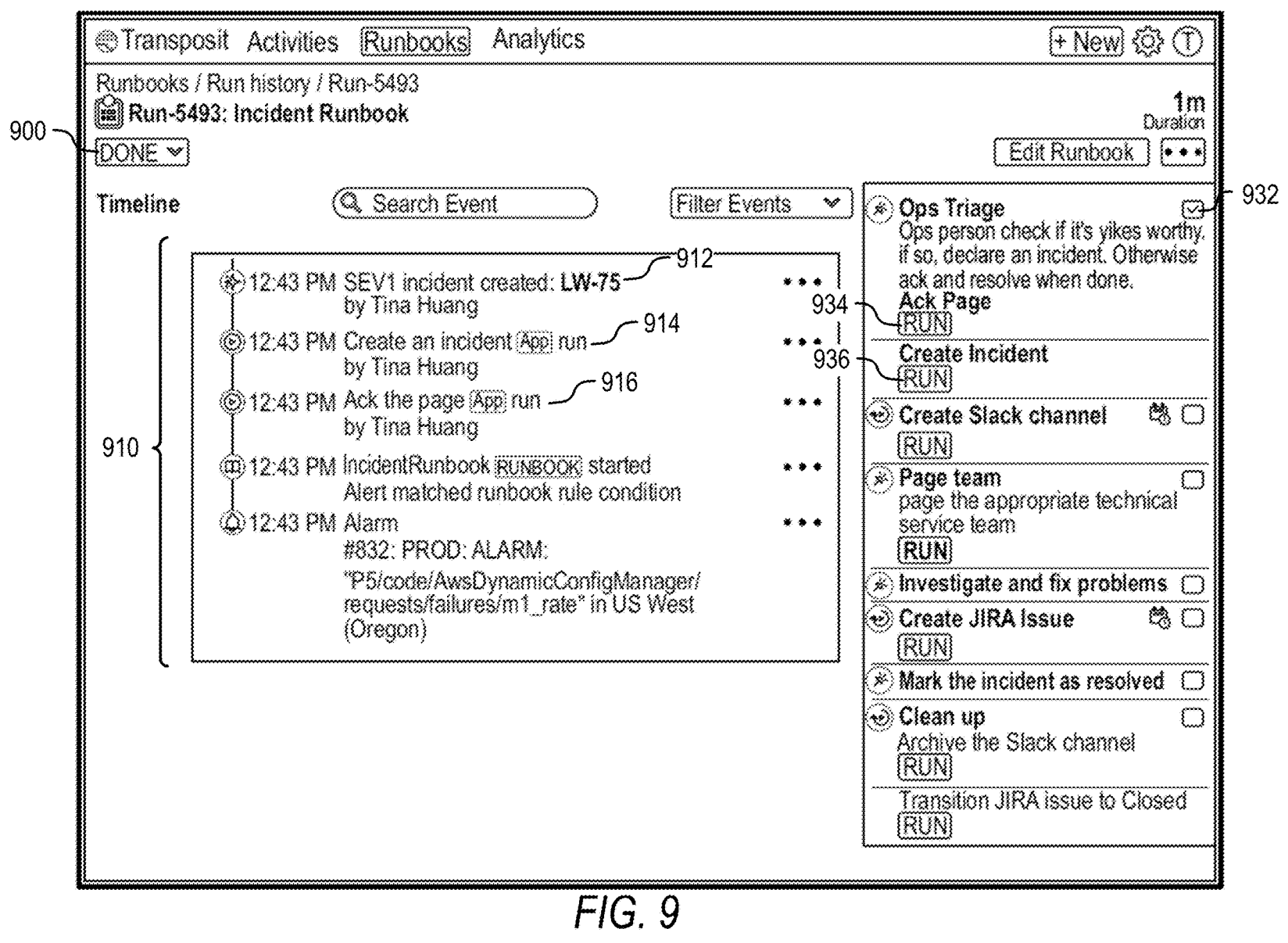

Continuing now to FIG. 9, the illustrated graphical user interface represents the graphical user interface of FIG. 8 after the user has selected (e.g., manually invoked) execution of the "Ack Page" action and the "Create Incident" action, of the "Ops Triage" step, via graphical buttons 934 and 936 respectively. As shown, checkbox 932 indicates that the "Ops Triage" step has been completed based on the "Ack Page" action and the "Create Incident" action completing execution. Field 900 indicates that the instance "Run-5493" is now done. Additionally, the timeline of section 910 has been updated to indicate at 916 that the "Ack Page" action was manually invoked by user "Tina Huang" through the graphical user interface, at 914 that the "Create Incident" action was manually invoked by user "Tina Huang" through the graphical user interface, and finally at 912 that an incident "LW-75" was created as a result of the "Create Incident" action completing execution.

Figure 10:
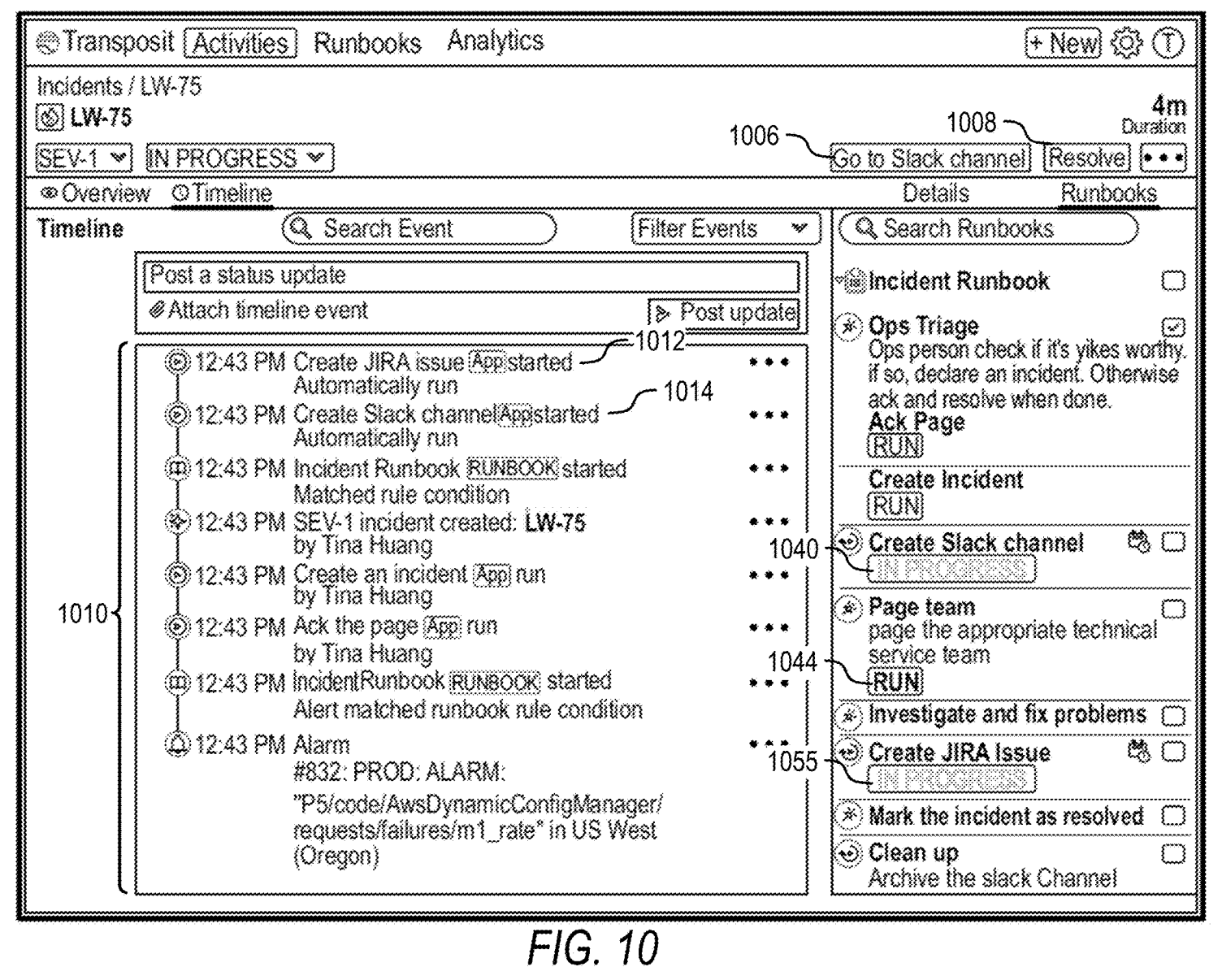

Continuing now to FIG. 10, the illustrated graphical user interface represents the graphical user interface of FIG. 9 after the "Create Slack Channel" action and the "Create JIRA Issue" action are automatically executed (e.g., run) for the instance "Run-5493" based on the definition of the "Incident Runbook." As shown, the instance "Run-5493" is now associated with the newly created incident of "LW-75." The automatic execution of the two actions are reflected at 1012 and 1014 in the timeline of section 1010, and graphical buttons 1040 and 1055 reflect that the "Create Slack Channel" action and the "Create JIRA Issue" action are in progress respectively and in parallel. When the user selects graphical button 1006, the user can be prompted or transitioned to a graphical user interface for accessing the SLACK channel generated by automatic execution of the "Create SLACK Channel" action. Additionally, when the user selects graphical button 1044 to invoke the "Page Team" action, the user can be prompted or transitioned to a graphical user interface similar to the one illustrated by FIG. 11. Eventually, after the incident "LW-75" has been resolved, a user can select graphical button 1008 to transition the incident to "Resolved," which can (e.g., automatically) cause "Mark the Incident as Resolved" step to be marked as completed, and which can (e.g., automatically) cause the "Clean Up" step to be performed.

Figure 11:
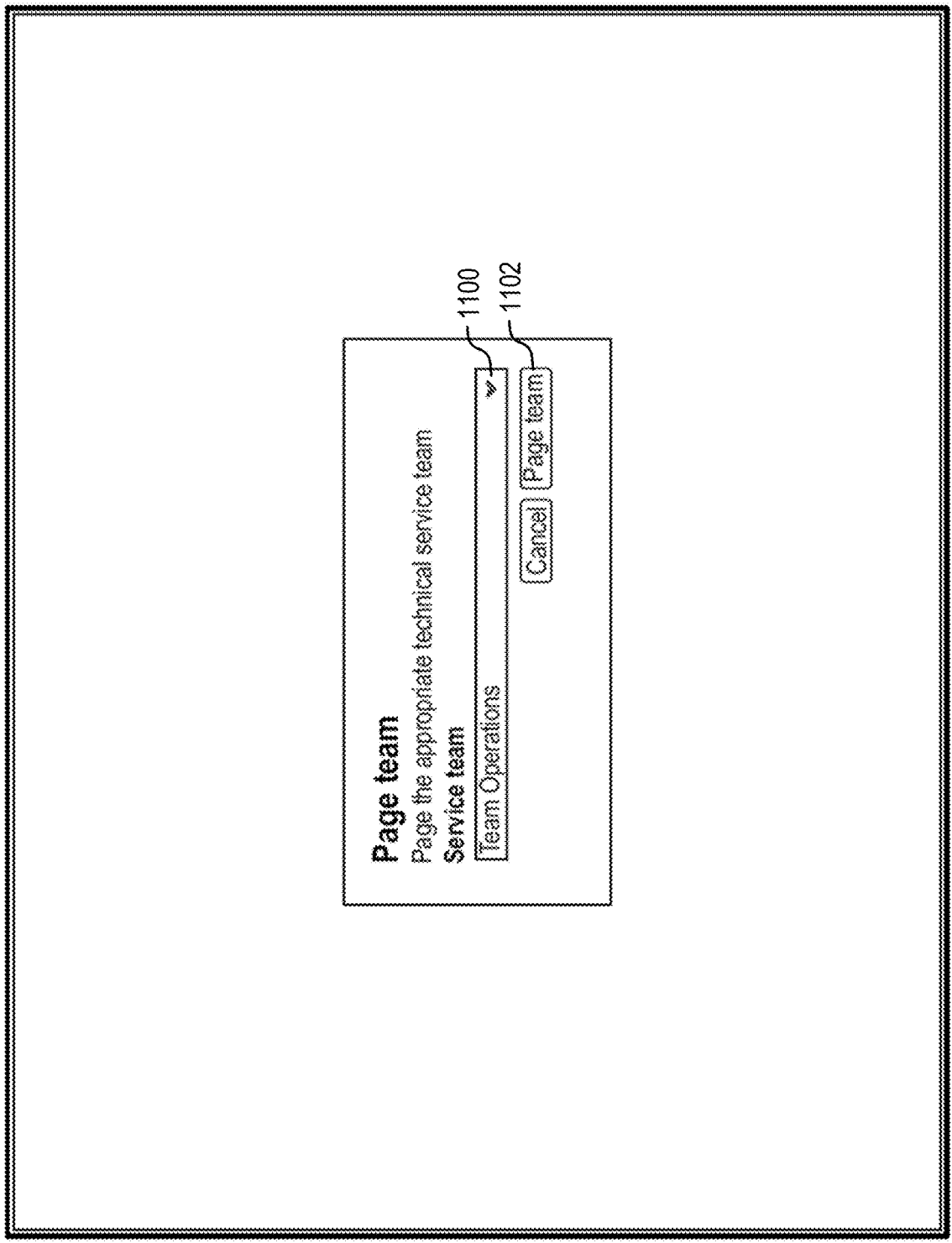

Referring now to FIG. 11, the illustrated example graphical user interface relates to the "Page Team" action and enables a user to select (via field 1100) a user team to page and to execute the page (via graphical button 1102).

Figure 12:
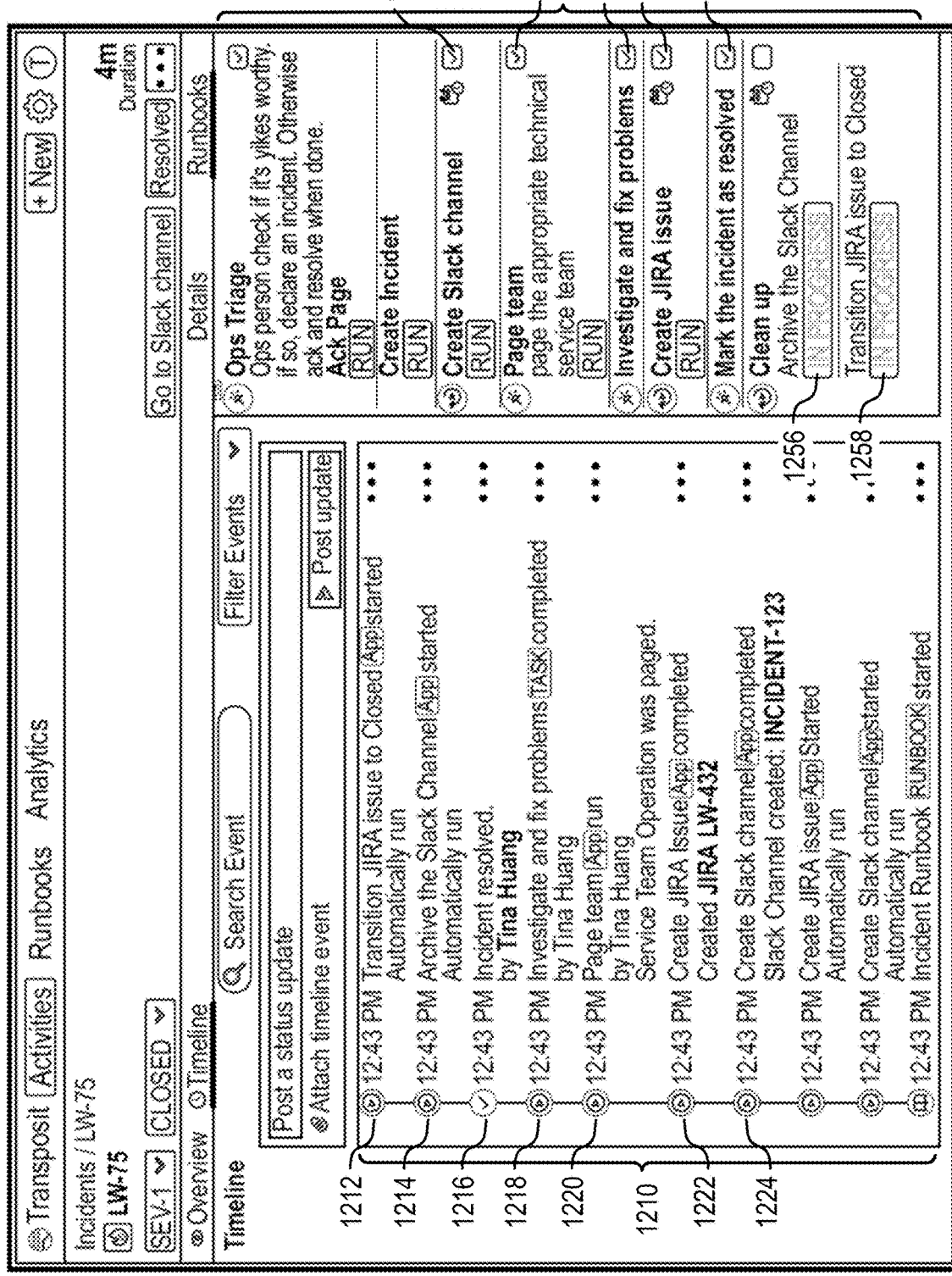

Referring now to FIG. 12, the illustrated example graphical user interface represents the graphical user interface of FIG. 10 after the "Create SLACK Channel" action has completed execution for the instance "Run-5493"; the "Create JIRA Issue" action has completed execution for the instance "Run-5493"; the "Page Team" action has completed execution for the instance "Run-5493"; the "Investigate and Fix Problems" step has been completed for the instance "Run-5493"; the incident has been transitioned to "Resolved" for the instance "Run-5493"; the "Archive the Slack Channel" action of the "Clean Up" step has been automatically executed for the instance "Run-5493" based on the definition of the "Incident Runbook"; and the "Transition JIRA issue to Closed" action of the "Clean Up" step has been automatically executed for the instance "Run-5493" based on the definition of the "Incident Runbook." The timeline of section 1210 reflects this at 1224, 1222, 1220, 1218, 1216, 1214, and 1212 respectively. Graphical buttons 1256 and 1258 reflect that the "Archive the Slack Channel" action and the "Transition JIRA issue to Closed" action are in progress respectively and in parallel. Additionally, checkboxes 1238, 1242, 1246, 1248, and 1252 indicate the completion of the "Create SLACK Channel" action, the "Page Team" action, "Investigate and Fix Problems" step, the "Create JIRA Issue" action, and the "Mark the Incident as Resolved" step respectively.

Figure 13:
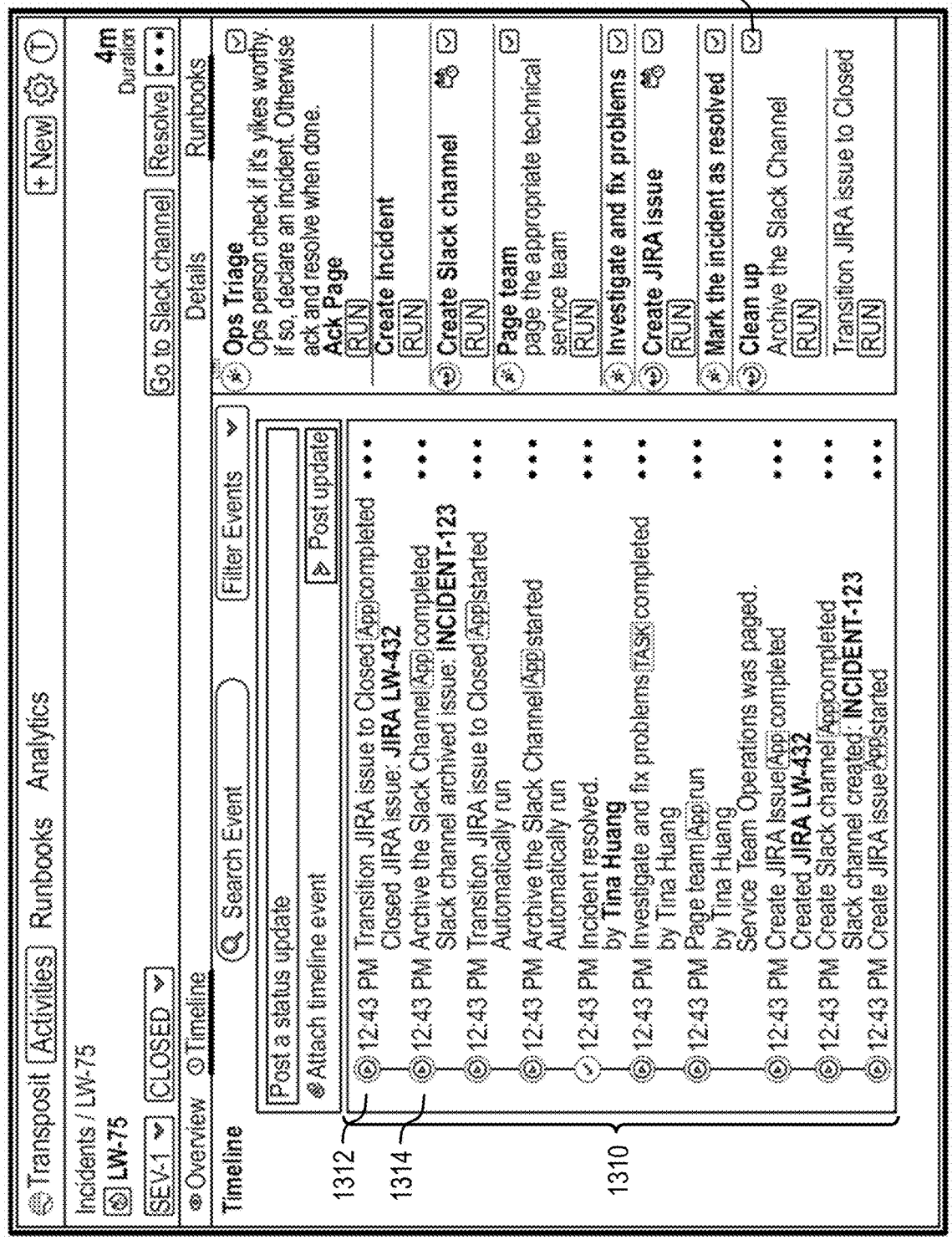

Referring now to FIG. 13, the illustrated example graphical user interface represents the graphical user interface of FIG. 12 after the "Archive the Slack Channel" action of the "Clean Up" step has completed execution for the instance "Run-5493," and the "Transition JIRA issue to Closed" action of the "Clean Up" step has completed execution for the instance "Run-5493." The timeline of section 1310 reflects this at 1314 and 1312 respectively. Additionally, based on the two actions completing execution, checkbox 1354 is updated to indicate that the "Clean Up" step for the instance "Run-5493" has been completed.

FIGS. 14 through 26 are screenshots illustrating example graphical user interfaces relating to accessing or using an interactive electronic document for a runbook through a software tool for team-based communication, according to some embodiments. Though FIGS. 14 through 26 illustrate examples with respect to a software tool for team-based communication, various embodiments can support implementation with respect to other types of software tools, include IDEs and DevOp software tools.

Figure 14:
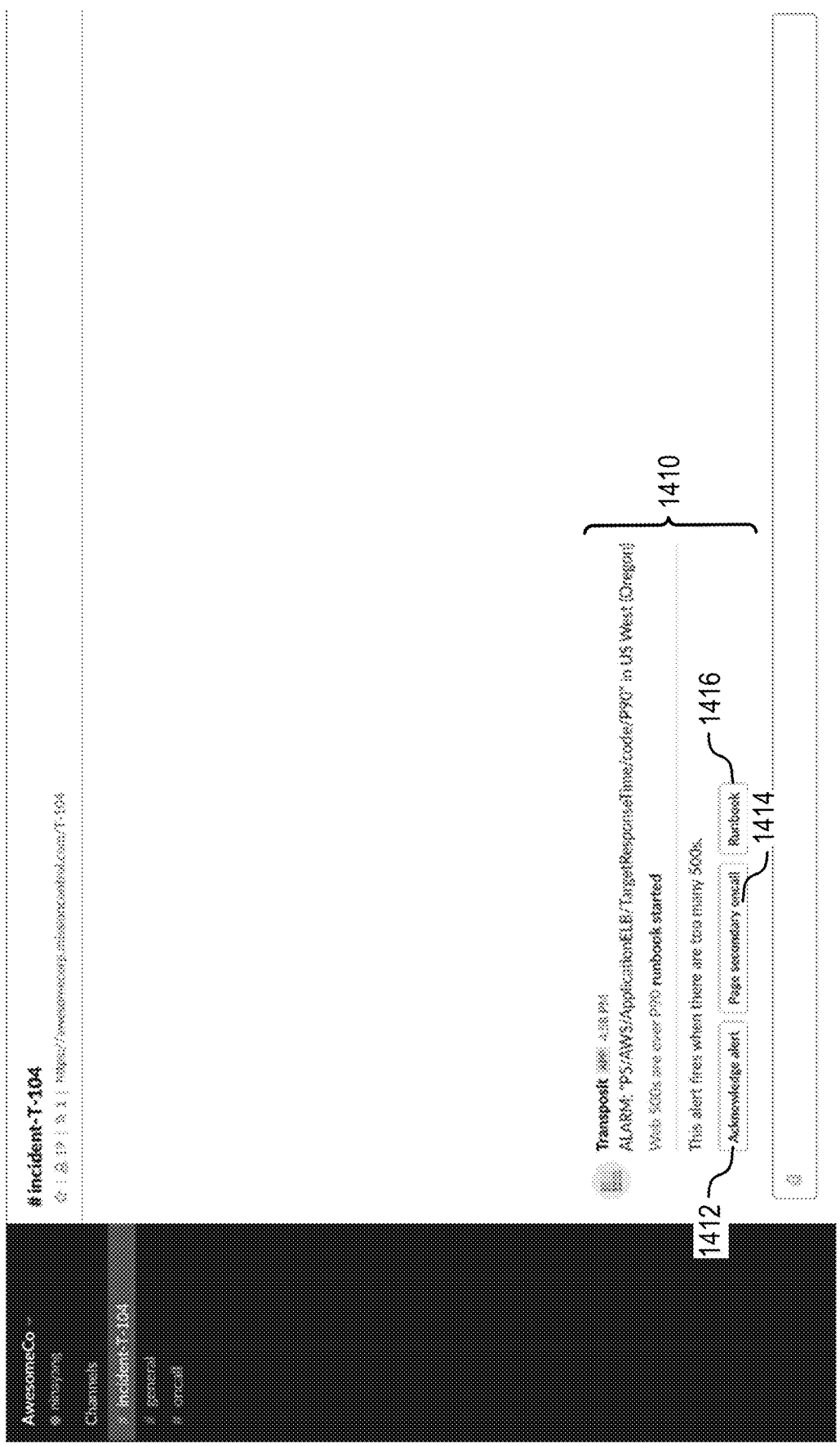

Referring now to FIG. 14, the illustrated example graphical user interface presents a communications channel (e.g., thread) named "#incident-T-104," which is accessible to multiple users (e.g., system administrators or system engineers). According to some embodiment, the communication channel is generated by a manually or automatically invoked action (e.g., to create a communication channel) defined for a specific runbook (e.g., "Web 500s over P90" runbook). As shown, in the "#incident-T-104" channel, a message 1410 is (e.g., automatically) posted that an alarm was detected relating to too many Web 500 errors being generated by a system or service, and that an instance of "Web 500s over P90" runbook has been generated in response. Through the graphical user interface, a user can respond to the message 1410 by selecting graphical button 1412 to execute the "Acknowledge Alert" action defined by the runbook, selecting graphical button 1414 to execute the "Page secondary oncall" action defined the runbook, or selecting graphical button 1416 to open an interactive electronic document for the current instance of the runbook. Depending on the embodiment, when the user selects to open the interactive electronic document for the current instance (of the runbook), the interactive electronic document can be opened and accessed within the current graphical user interface (e.g., as a multi-modal page) or the user can be transitioned to another graphical user interface (e.g., one of the graphical user interfaces illustrated by FIGS. 8 through 13) to access the interactive electronic document.

Figure 15:
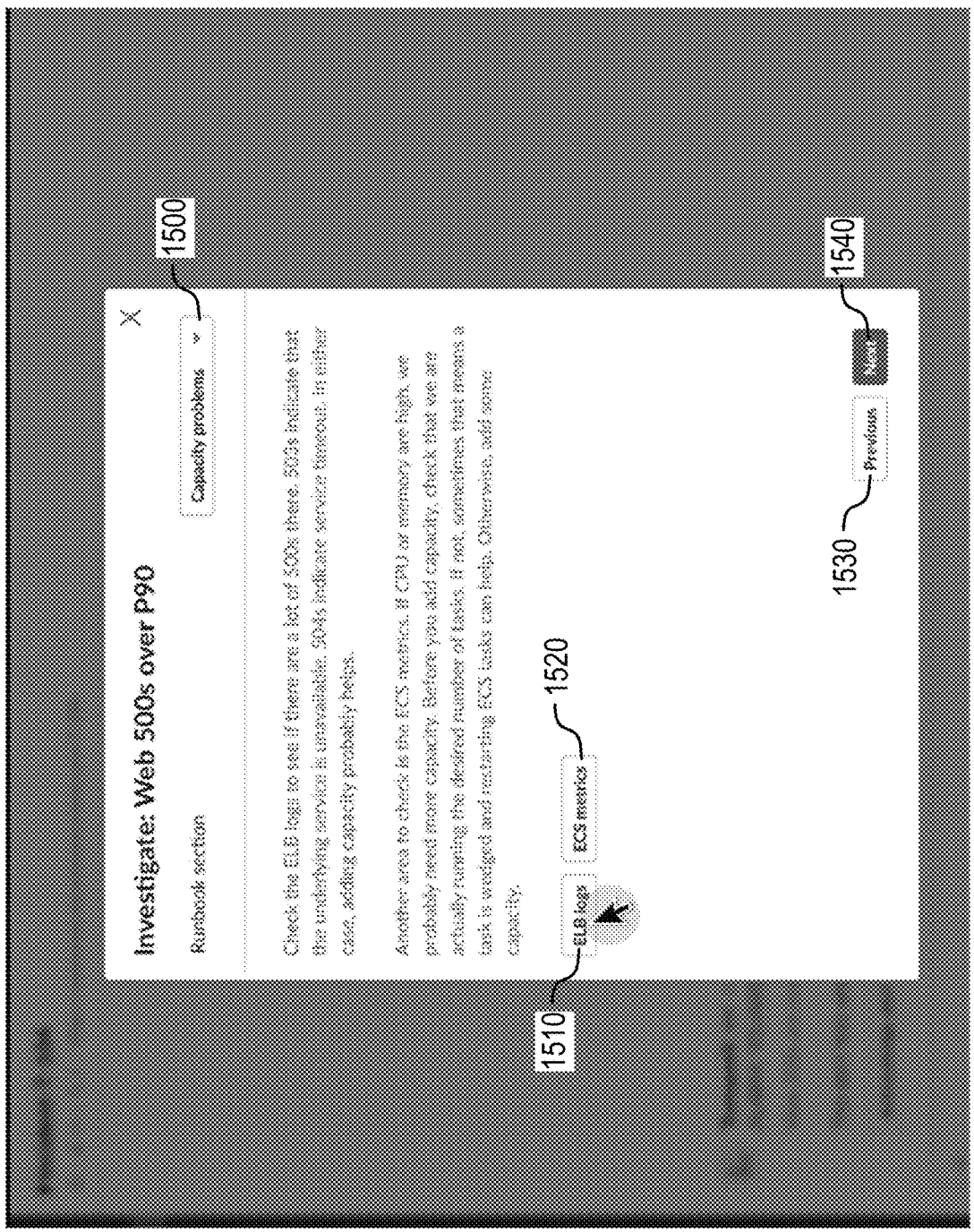

Referring now to FIG. 15, the illustrated example graphical user interface presents a multi-modal page representing an interactive electronic document of the "Web 500s over P90" runbook, where the multi-modal page is accessed through a software tool (e.g., one for team-based communication). As shown, field 1500 indicates the current section of the interactive electronic document being presented by the multi-modal page, and can further enable a user to navigate to another section of the interactive electronic document. As also shown, a user can invoke Previous and Next actions by the multi-modal page through graphical buttons 1530 and 1540 respectively, the user can invoke an action to open and access Elastic Load Balancing (ELB) logs through graphical button 1510, and the user can invoke an action to open and access AMAZON ECS metrics through graphical button 1520. As users access these buttons, various embodiments can track (e.g., for the "Web 500s over P90" runbook) what processes users are taking to investigate or remediate their issues.

Figure 16:
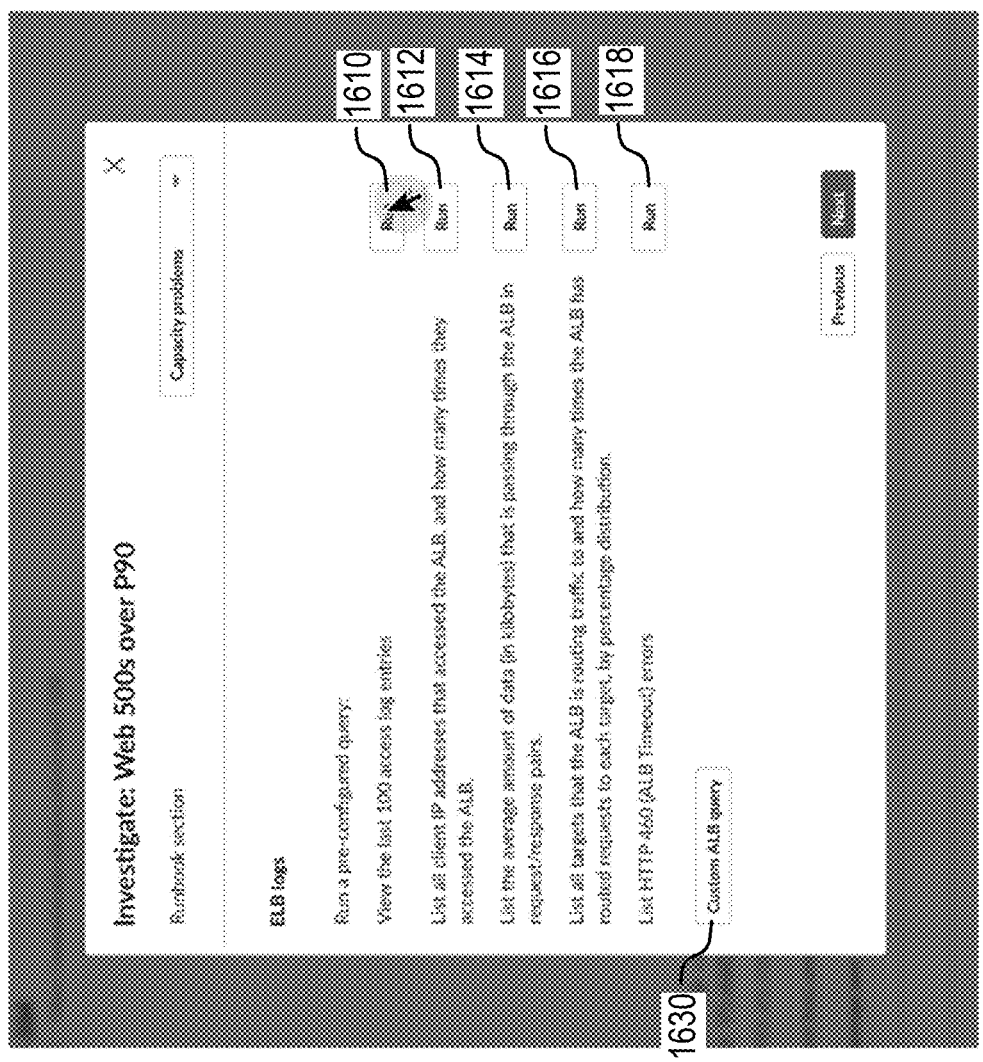

Referring now to FIG. 16, the illustrated example graphical user interface presents an example of the multi-modal page of FIG. 15 after a user selects graphical button 1510 to access the ELB logs. As shown, the multi-modal page of FIG. 16 lists a number of user-invokable actions, defined by the "Web 500s over P90" runbook, for executing pre-configured queries against the ELB logs to investigate the "Web 500s over P90" issue originally detected. For instance, the user can select graphical button 1610 to invoke an action to execute a pre-configured query to view the last 100 log entries of the ELB log. The user can select graphical button 1612 to invoke an action to execute a pre-configured query relating to listing client IP addresses from the ELB log. The user can select graphical button 1614 to invoke an action to execute a pre-configured query relating to listing average amounts of data from the ELB log. The user can select graphical button 1616 to invoke an action to execute a pre-configured query relating to listing targets from the ELB log. The user can select graphical button 1618 to invoke an action to execute a pre-configured query relating to listing HTTP 460 errors from the ELB log. Additionally, the user can select graphical button 1630 to invoke an action to permit the user to execute a custom query against the ELB log. For some embodiments, the results of one or more of these actions can be generated and outputted (e.g., posted) back to a communication channel from which the multi-modal page of FIG. 16 is accessed.

Figure 17:
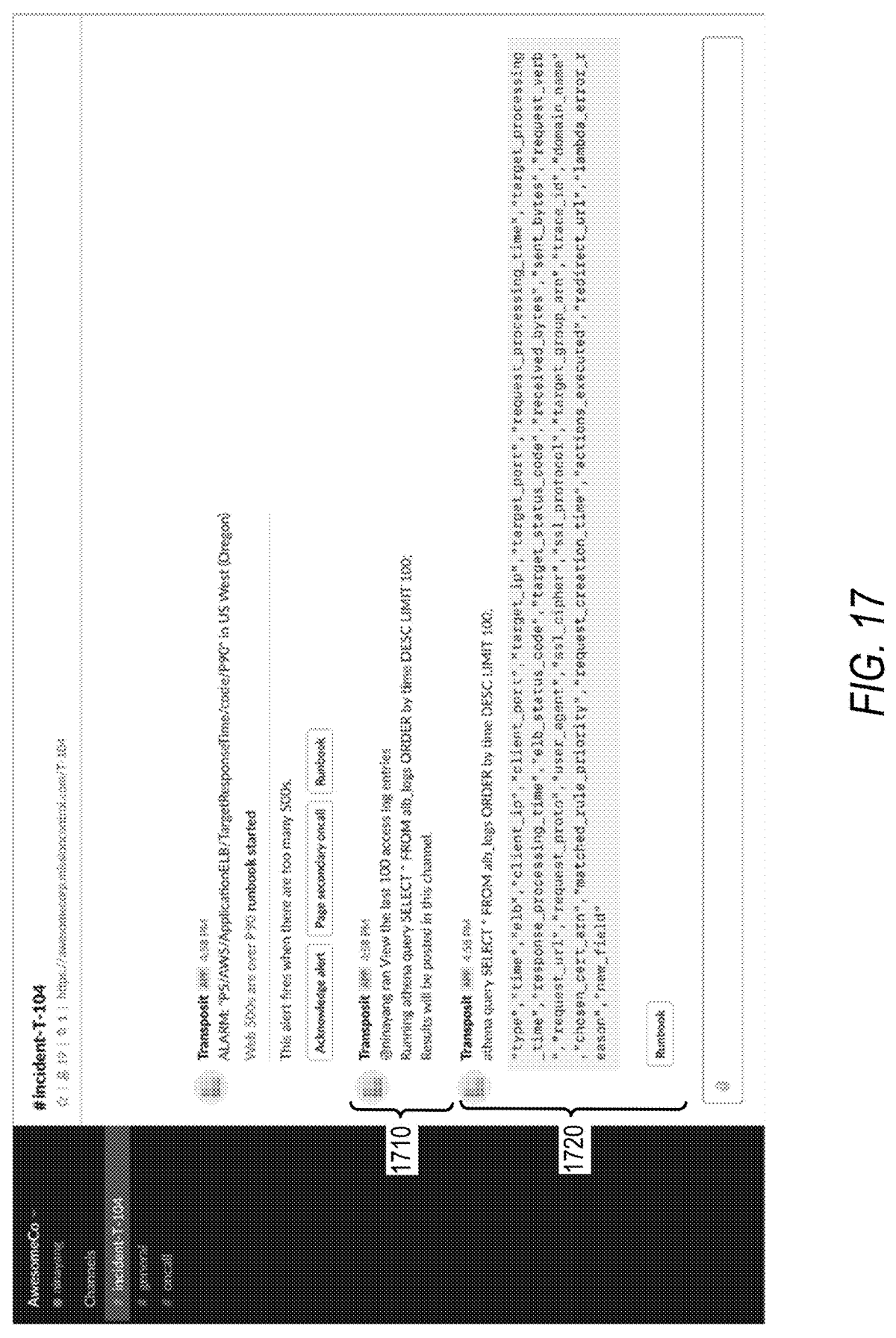

Referring now to FIG. 17, the illustrated example graphical user interface represents the graphical user interface of FIG. 14 after some of the actions listed on the multi-modal page illustrated by FIG. 16 are invoked by a user. In particular, message 1710 represents an example result of a user selecting graphical button 1610 to invoke the corresponding action, and message 1720 represents an example result of the user selecting graphical button 1630 to invoke the corresponding action.

Figure 18:
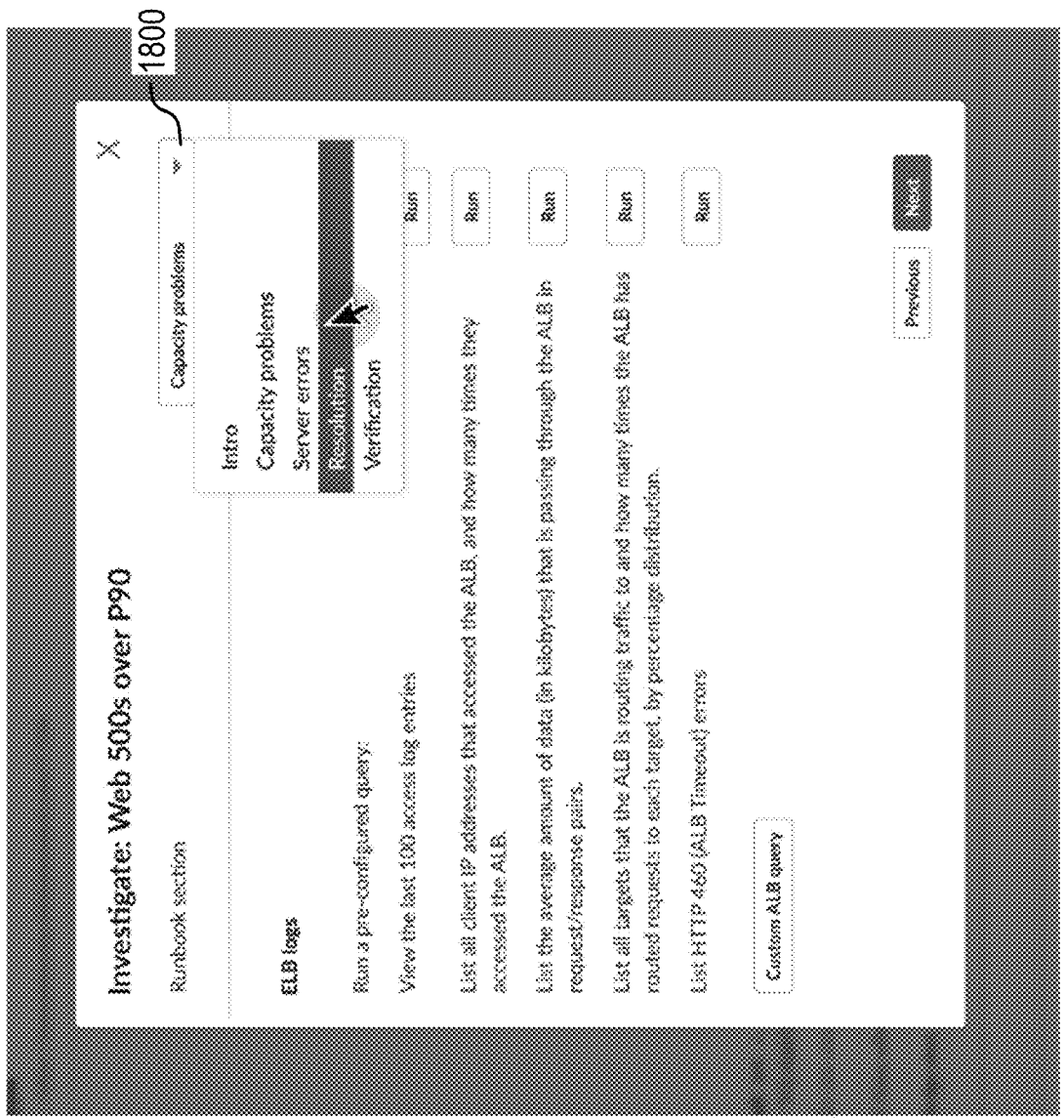

Referring now to FIG. 18, the illustrated example graphical user interface represents the graphical user interface of FIG. 16 when a user uses an included field to navigate to another section of the interactive electronic document of the "Web 500s over P90" runbook. In particular, the user is using field 1800 to navigate to a "Resolution" section of the interactive electronic document as defined by the "Web 500s over P90" runbook.

Figure 19:
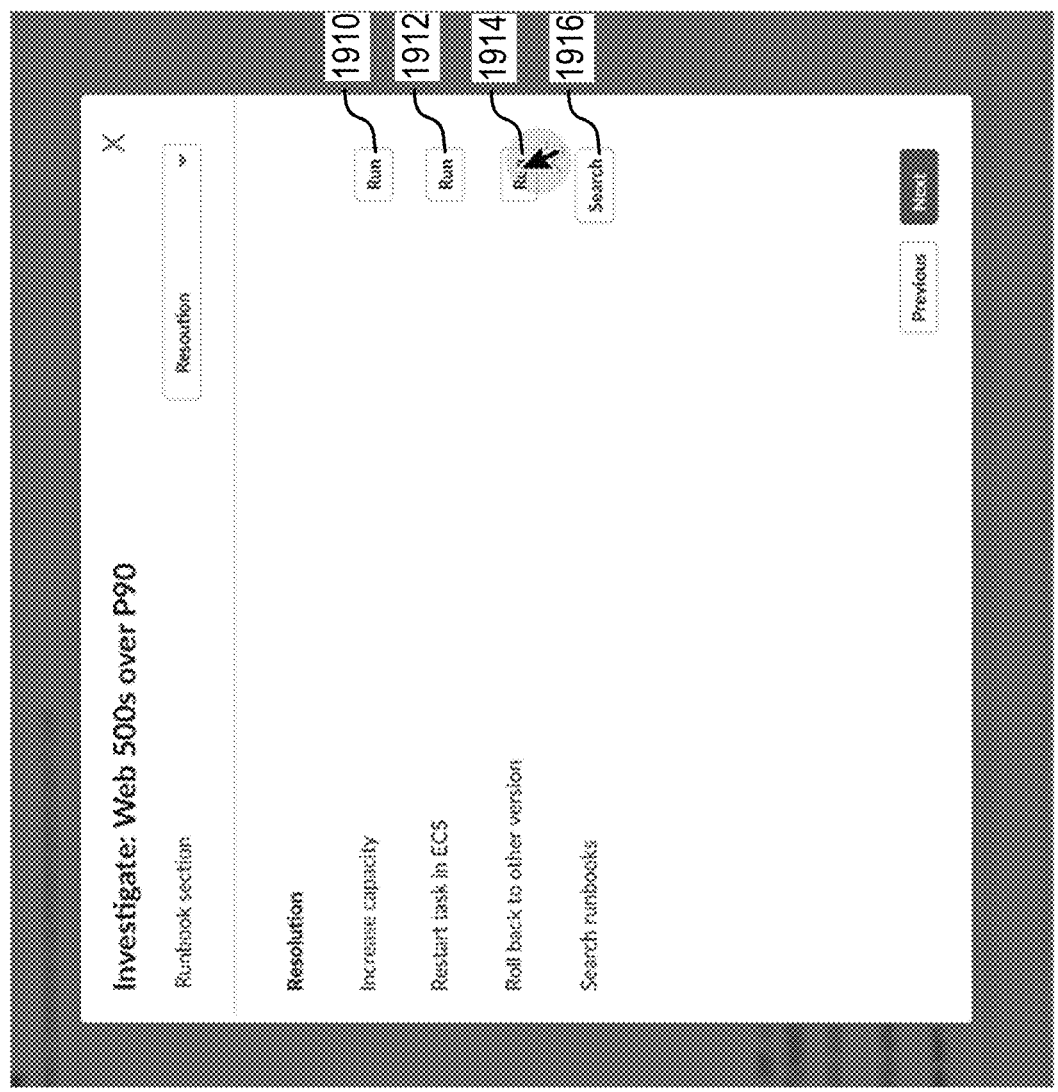

Referring now to FIG. 19, the illustrated example graphical user interface represents the graphical user interface of FIG. 18 after a user uses field 1800 to navigate to the "Resolution" section of the interactive electronic document of the "Web 500s over P90" runbook. In particular, the multi-modal page of FIG. 19 lists a number of user-invokable actions defined by the "Web 500s over P90" runbook for resolving the "Web 500s over P90" issue originally detected. For instance, the user can select graphical button 1910 to invoke an action to increase capacity for the AMAZON ECS service experiencing the "Web 500s over P90" issue. The user can select graphical button 1912 to invoke an action to a task in the AMAZON ECS service that is experiencing the "Web 500s over P90" issue. The user can select graphical button 1914 to invoke an action to roll back to a prior version of software or code for the AMAZON ECS service that is experiencing the "Web 500s over P90" issue. Additionally, the user can select graphical button 1916 to search for another runbook that could assist in addressing the "Web 500s over P90" issue.

Figure 20:
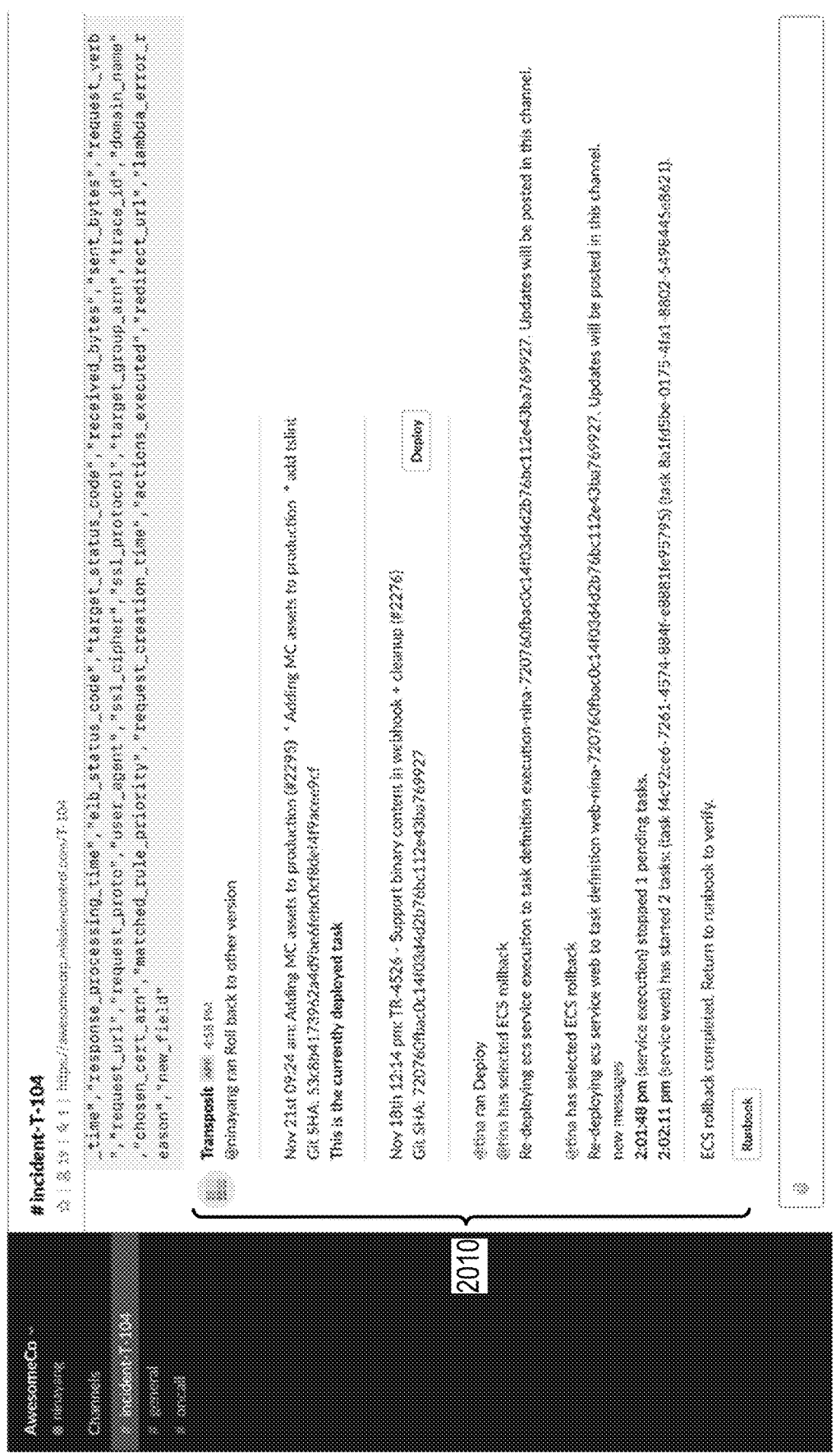

Referring now to FIG. 20, the illustrated example graphical user interface represents the graphical user interface of FIG. 17 after some of the actions listed on the multi-modal page illustrated by FIG. 19 are invoked by a user. In particular, message 2010 represents an example result of a user selecting graphical button 1914 to invoke the corresponding action.

Figure 21:
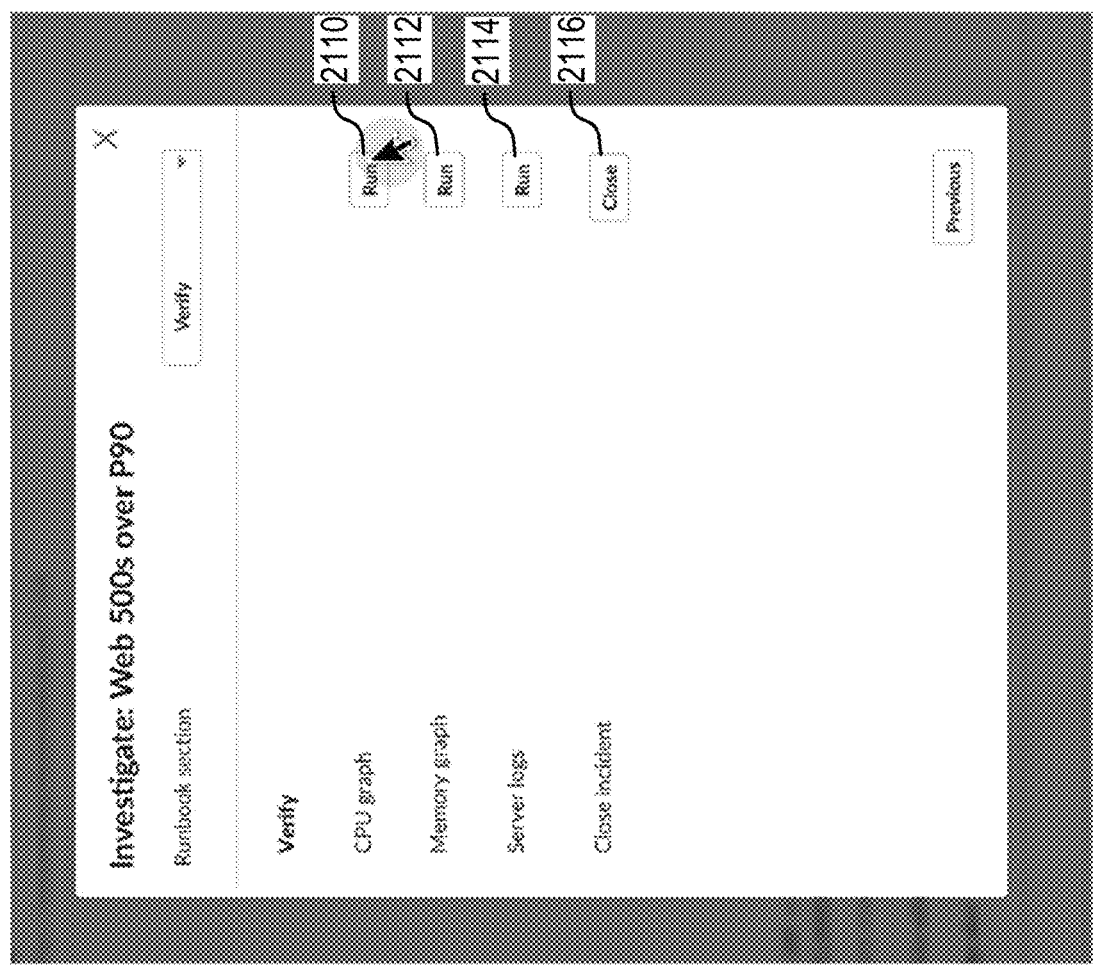

Referring now to FIG. 21, the illustrated example graphical user interface represents the graphical user interface of FIG. 19 when a user uses an included field to navigate to a "Verify" section of the interactive electronic document of the "Web 500s over P90" runbook. The multi-modal page of FIG. 21 lists a number of user-invokable actions defined by the "Web 500s over P90" runbook for verifying the "Web 500s over P90" issue originally detected has been resolved. For instance, the user can select graphical button 2110 to invoke an action to generate a CPU graph for the AMAZON ECS service that experienced the "Web 500s over P90" issue. The user can select graphical button 2112 to invoke an action to generate a memory graph for the AMAZON ECS service that experienced the "Web 500s over P90" issue. The user can select graphical button 2114 to invoke an action to access server logs for the AMAZON ECS service that experienced the "Web 500s over P90" issue. Finally, the user can select graphical button 2116 to cause the incident (that caused the "Web 500s over P90" runbook to run) to be closed.

Figure 22:
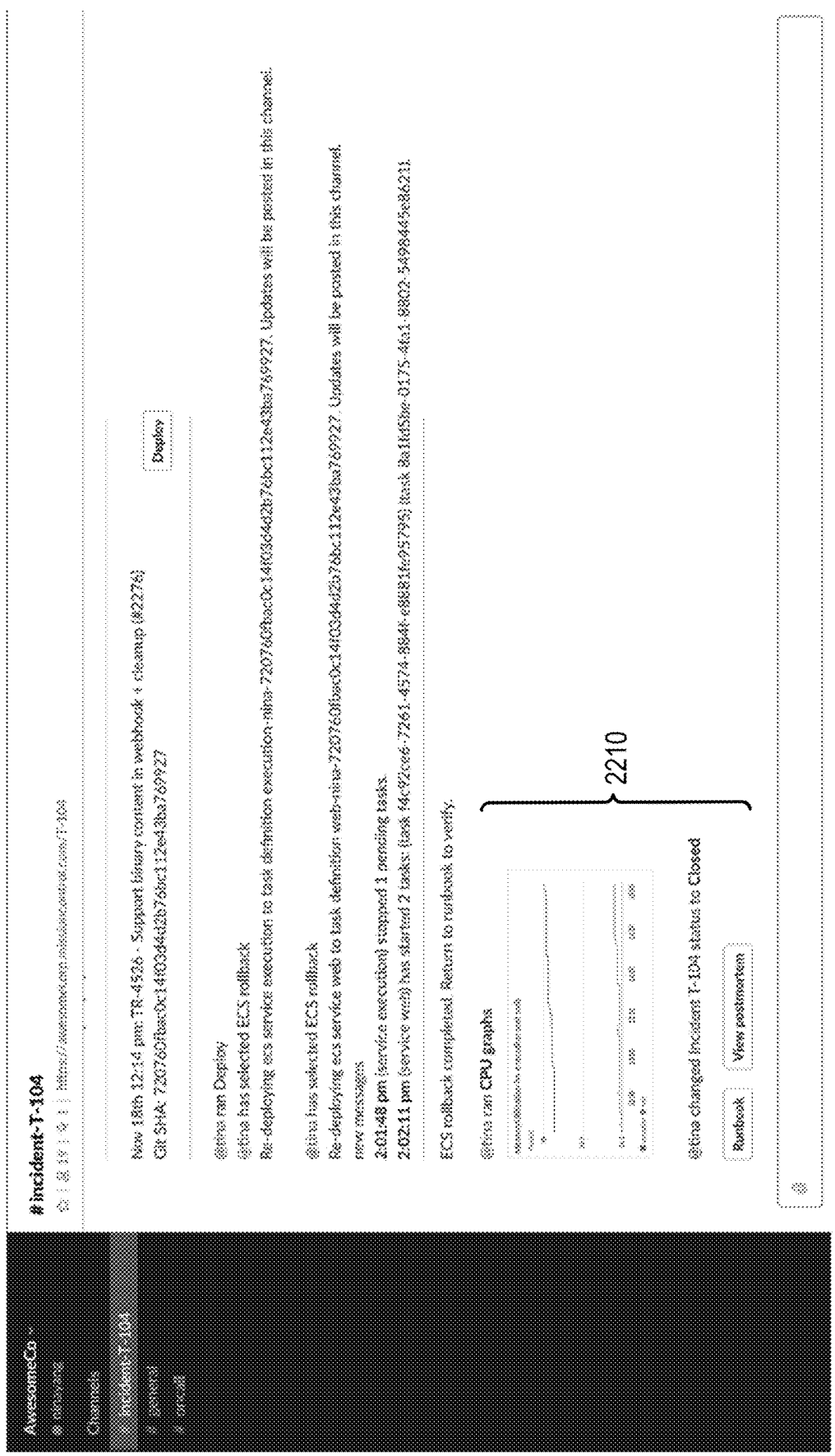

Referring now to FIG. 22, the illustrated example graphical user interface represents the graphical user interface of FIG. 20 after some of the actions listed on the multi-modal page illustrated by FIG. 21 are invoked by a user. In particular, message 2210 represents an example result of a user selecting graphical button 2110 to invoke the corresponding action.

Figure 23:
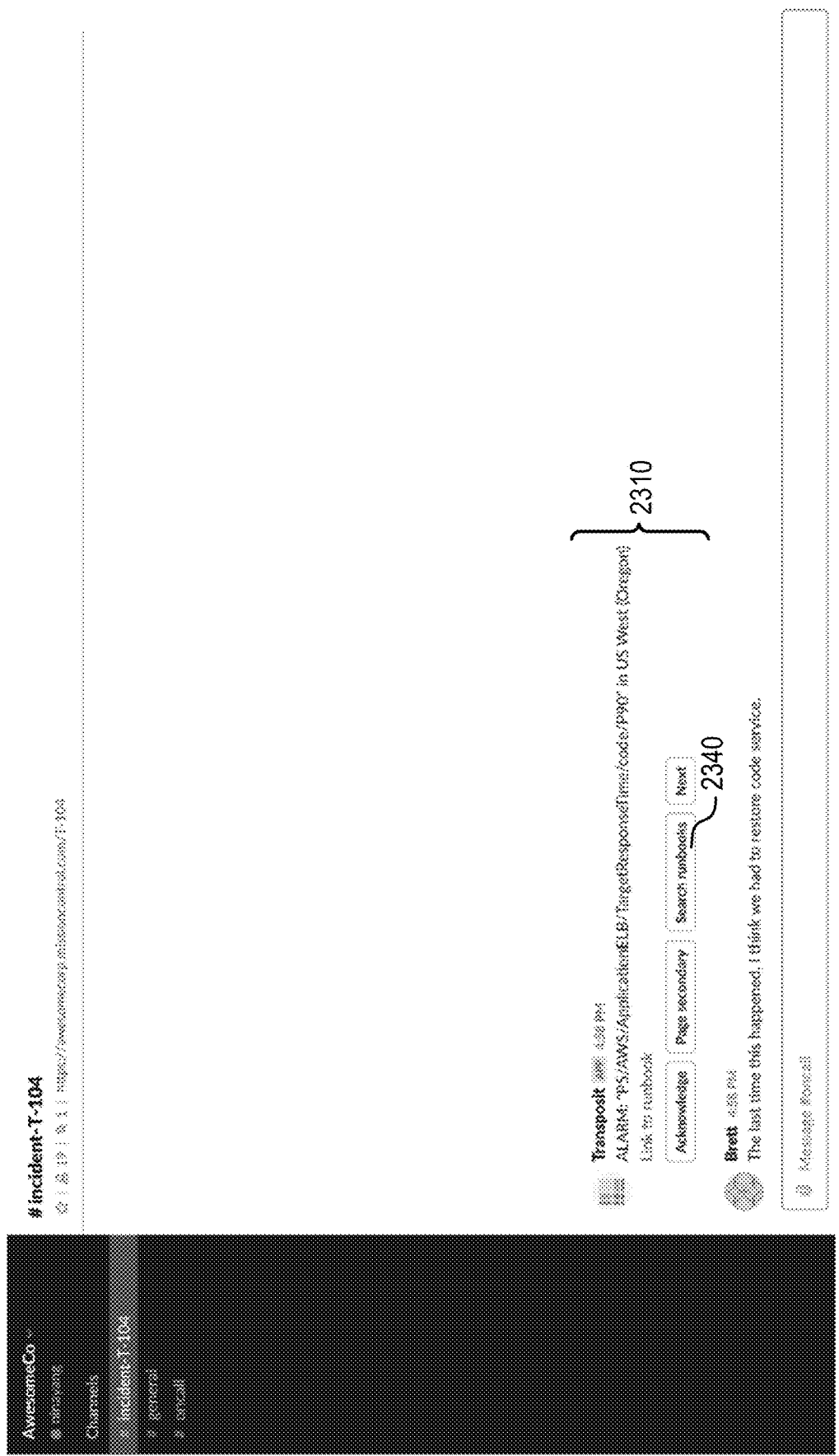

Referring now to FIG. 23, the illustrated example graphical user interface is similar to the graphical user interface of FIG. 14 but includes an additional graphical button 2340 that enables a user to search for a runbook in connection with the alert described by message 2310.

Figure 24:
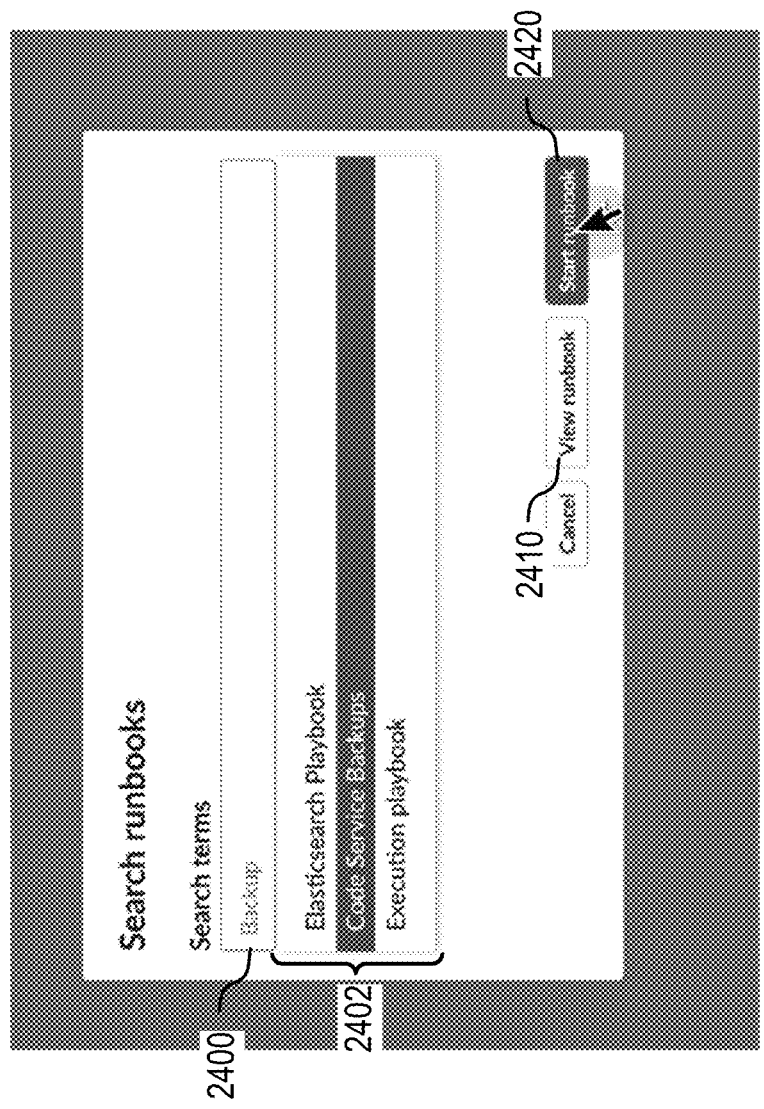

Referring now to FIG. 24, the illustrated example graphical user interface presents a multi-modal page (representing an interactive electronic document of the "Web 500s over P90" runbook) that can be provided in response to a user selecting graphical button 2340 in the graphical user interface of FIG. 23. As shown, field 2400 enables a user to enter search terms (e.g., "backup") for a runbook, section 2402 presents results of the search, selection of graphical button 2410 enables a user to view a runbook selected in the section 2402, and selection of graphical button 2420 enables a user to start (e.g., generate an instance of) a runbook selected in the section 2402.

Figure 25:
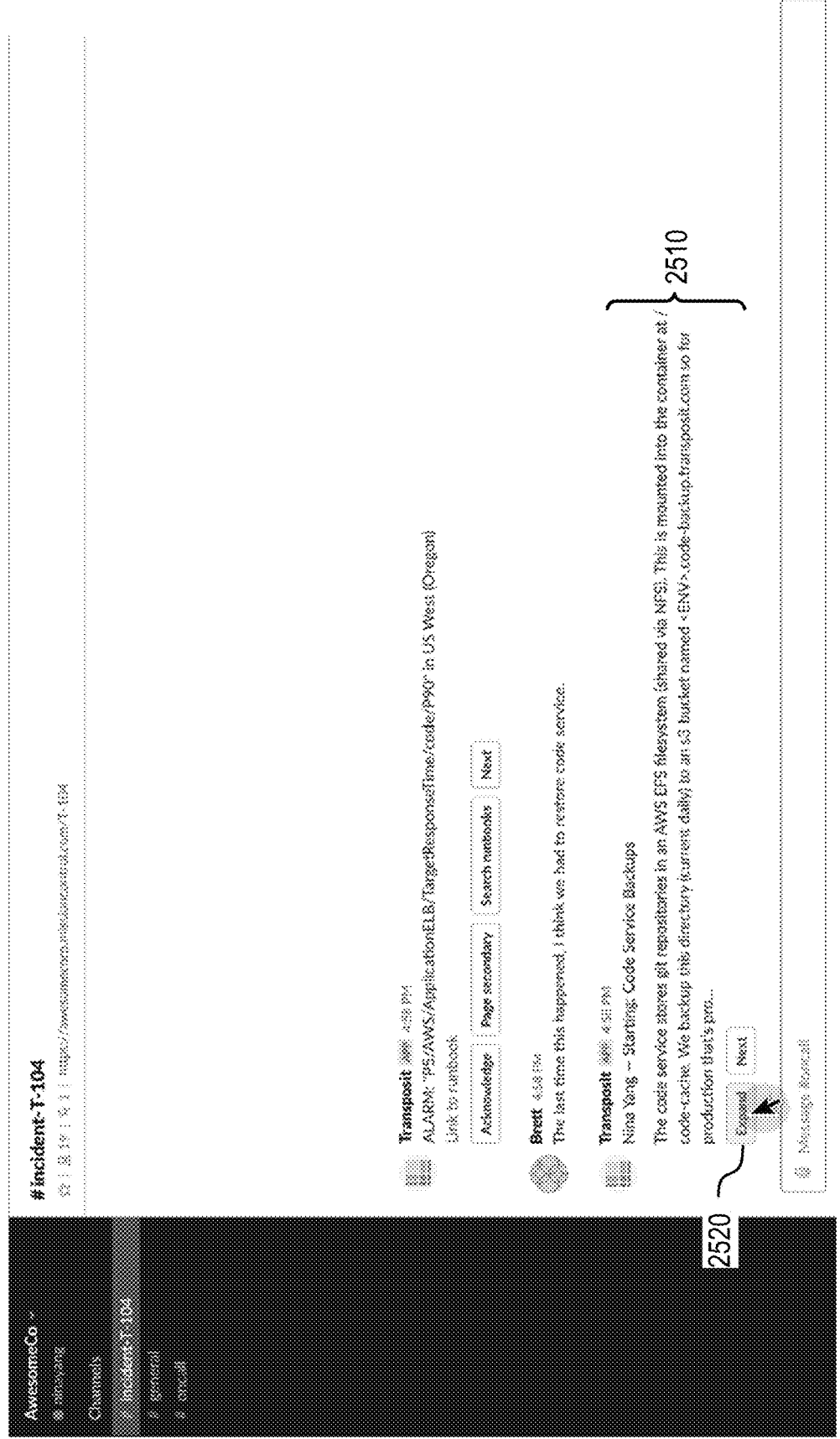

Referring now to FIG. 25, the illustrated example graphical user interface represents the graphical user interface of FIG. 23 after a user selects to start (e.g., generate an instance of) a "Code Service Backups" runbook through the multi-modal page of FIG. 24. In particular, message 2510 indicates that a "Code Service Backups" was run by user "Nina Yang," and includes graphical button 2520 that enables a user to expand details regarding the operational event described by the message 2510.

Figure 26:
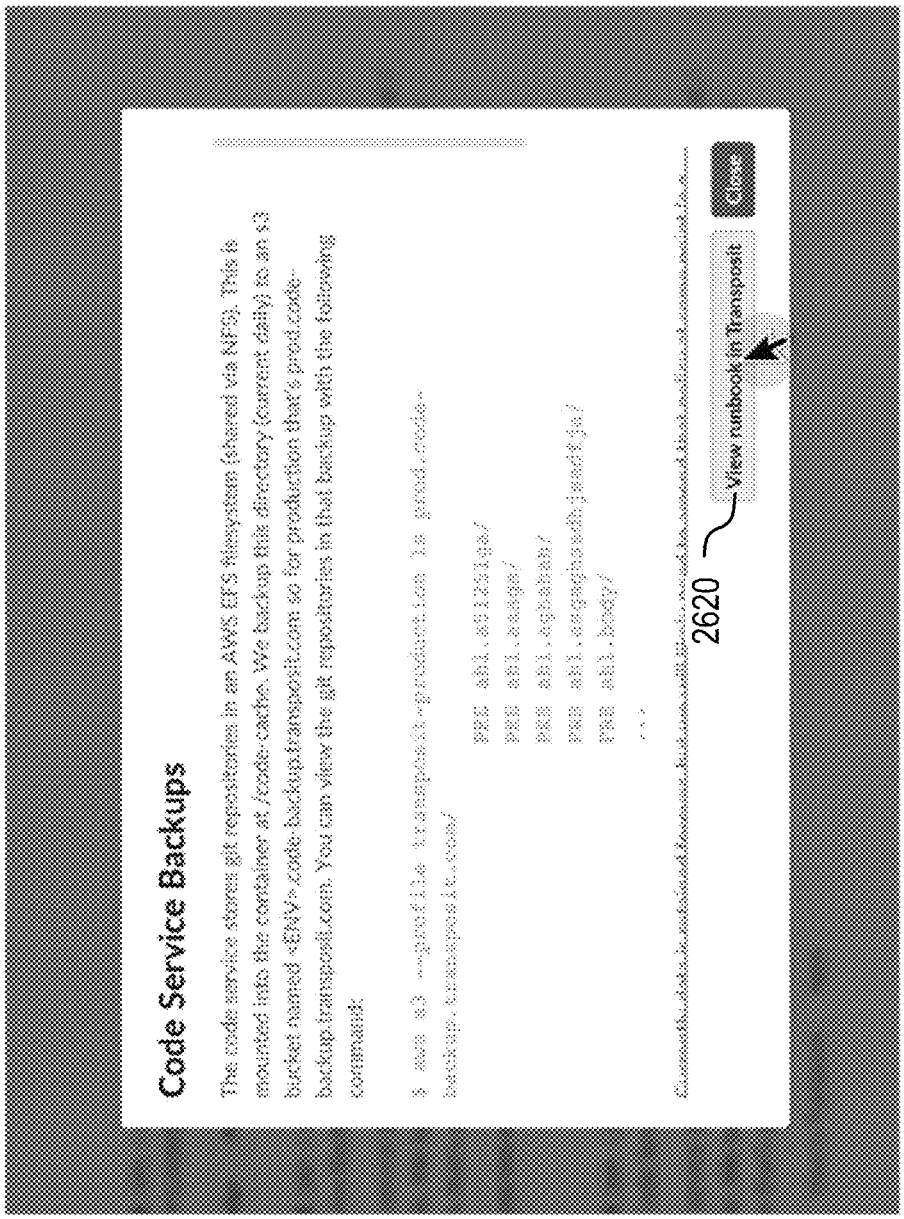

Referring now to FIG. 26, the illustrated example graphical user interface presents a multi-modal page showing expanded details regarding the "Code Service Backups" runbook started by way of the multi-modal page of FIG. 24. In particular, the multi-modal page of FIG. 26 can be presented to a user in response to the user selecting graphical button 2520 in the graphical user interface of FIG. 25. A shown, the multi-modal page of FIG. 26 includes graphical button 2620, which enables a user to view the started (e.g., generated) instance of the "Code Service Backups" runbook through a native graphical user interface for the runbook (e.g., one provided by the operational activities system 122).

Figure 27:
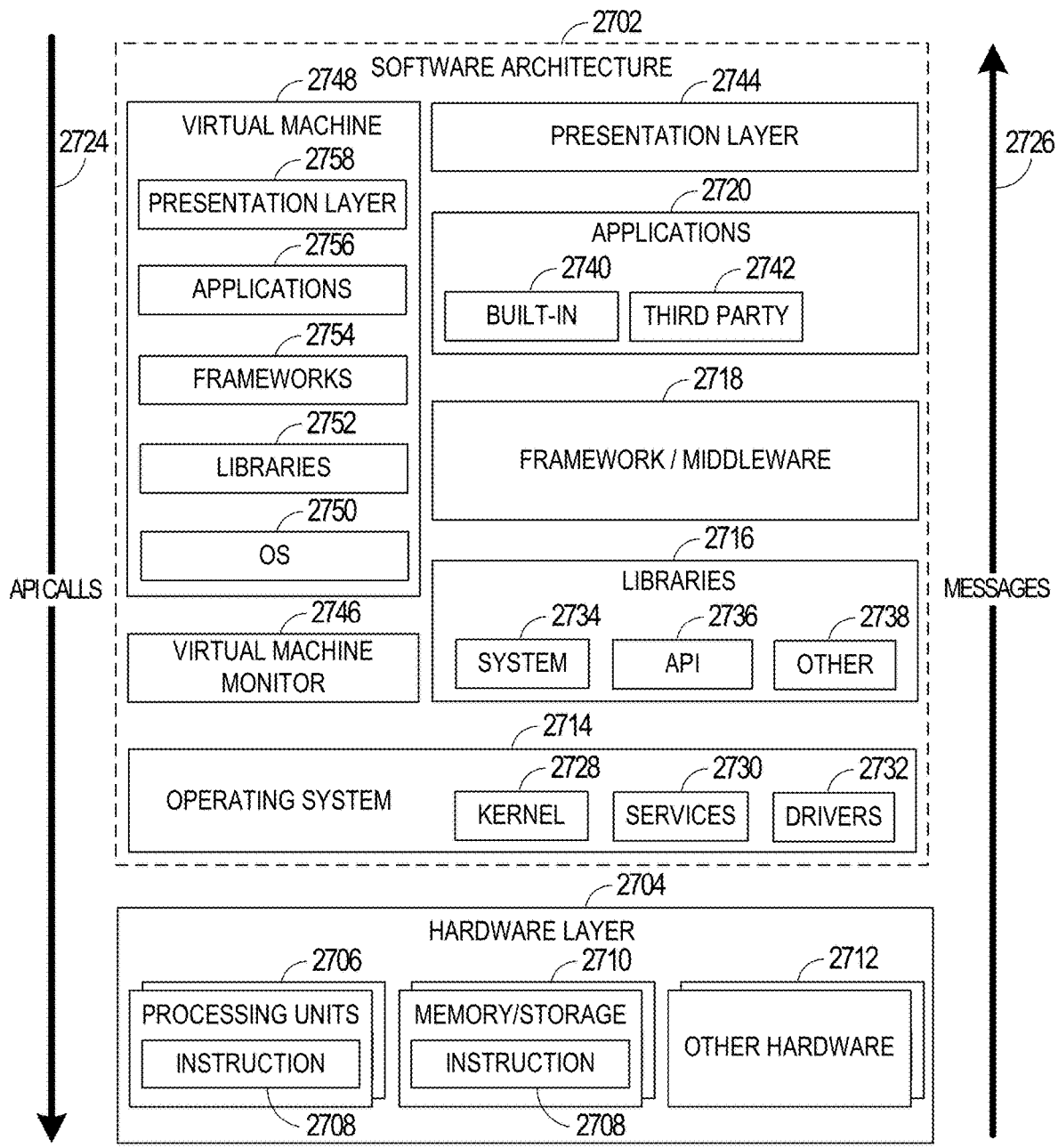
FIG. 27 is a block diagram illustrating a representative software architecture, which may be used in conjunction with various hardware architectures herein described, according to various embodiments of the present disclosure.
Figure 28:
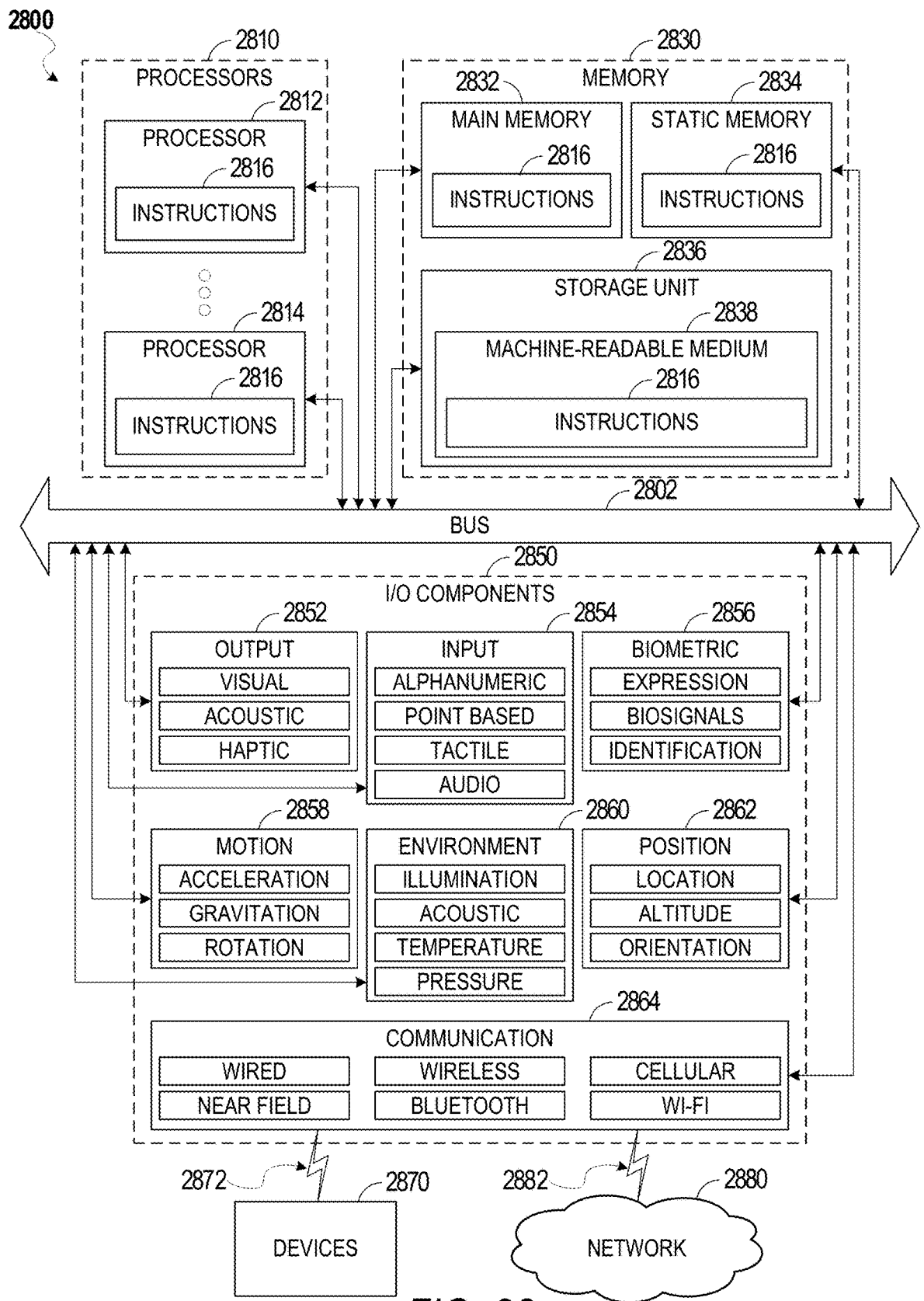
FIG. 28 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 27 or by way of the example machine illustrated by and described with respect to FIG. 28.

FIG. 27 is a block diagram illustrating an example of a software architecture 2702 that may be installed on a machine, according to some example embodiments. FIG. 27 is merely a non-limiting example of a software architecture, and it will be appreciated that many other architectures may be implemented to facilitate the functionality described herein. The software architecture 2702 may be executing on hardware such as a machine 2800 of FIG. 28 that includes, among other things, processors 2810, memory 2830, and I/O components 2850. A representative hardware layer 2704 is illustrated and can represent, for example, the machine 2800 of FIG. 28. The representative hardware layer 2704 comprises one or more processing units 2706 having associated executable instructions 2708. The executable instructions 2708 represent the executable instructions of the software architecture 2702. The hardware layer 2704 also includes memory or storage modules 2710, which also have the executable instructions 2708. The hardware layer 2704 may also comprise other hardware 2712, which represents any other hardware of the hardware layer 2704, such as the other hardware illustrated as part of the machine 2800.

In the example architecture of FIG. 27, the software architecture 2702 may be conceptualized as a stack of layers, where each layer provides particular functionality. For example, the software architecture 2702 may include layers such as an operating system 2714, libraries 2716, frameworks/middleware 2718, applications 2720, and a presentation layer 2744. Operationally, the applications 2720 or other components within the layers may invoke API calls 2724 through the software stack and receive a response, returned values, and so forth (illustrated as messages 2726) in response to the API calls 2724. The layers illustrated are representative in nature, and not all software architectures have all layers. For example, some mobile or special-purpose operating systems may not provide a frameworks/middleware 2718 layer, while others may provide such a layer. Other software architectures may include additional or different layers.

The operating system 2714 may manage hardware resources and provide common services. The operating system 2714 may include, for example, a kernel 2728, services 2730, and drivers 2732. The kernel 2728 may act as an abstraction layer between the hardware and the other software layers. For example, the kernel 2728 may be responsible for memory management, processor management (e.g., scheduling), component management, networking, security settings, and so on. The services 2730 may provide other common services for the other software layers. The drivers 2732 may be responsible for controlling or interfacing with the underlying hardware. For instance, the drivers 2732 may include display drivers, camera drivers, Bluetooth© drivers, flash memory drivers, serial communication drivers (e.g., Universal Serial Bus (USB) drivers), Wi-Fi© drivers, audio drivers, power management drivers, and so forth depending on the hardware configuration.

The libraries 2716 may provide a common infrastructure that may be utilized by the applications 2720 and/or other components and/or layers. The libraries 2716 typically provide functionality that allows other software modules to perform tasks in an easier fashion than by interfacing directly with the underlying operating system 2714 functionality (e.g., kernel 2728, services 2730, or drivers 2732). The libraries 2716 may include system libraries 2734 (e.g., C standard library) that may provide functions such as memory allocation functions, string manipulation functions, mathematic functions, and the like. In addition, the libraries 2716 may include API libraries 2736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2716 may also include a wide variety of other libraries 2738 to provide many other APIs to the applications 2720 and other software components/modules.

The frameworks 2718 (also sometimes referred to as middleware) may provide a higher-level common infrastructure that may be utilized by the applications 2720 or other software components/modules. For example, the frameworks 2718 may provide various graphic user interface (GUI) functions, high-level resource management, high-level location services, and so forth. The frameworks 2718 may provide a broad spectrum of other APIs that may be utilized by the applications 2720 and/or other software components/modules, some of which may be specific to a particular operating system or platform.

The applications 2720 include built-in applications 2740 and/or third-party applications 2742. Examples of representative built-in applications 2740 may include, but are not limited to, a home application, a contacts application, a browser application, a book reader application, a location application, a media application, a messaging application, or a game application.

The third-party applications 2742 may include any of the built-in applications 2740, as well as a broad assortment of other applications. In a specific example, the third-party applications 2742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 2742 may invoke the API calls 2724 provided by the mobile operating system such as the operating system 2714 to facilitate functionality described herein.

The applications 2720 may utilize built-in operating system functions (e.g., kernel 2728, services 2730, or drivers 2732), libraries (e.g., system libraries 2734, API libraries 2736, and other libraries 2738), or frameworks/middleware 2718 to create user interfaces to interact with users of the system. Alternatively, or additionally, in some systems, interactions with a user may occur through a presentation layer, such as the presentation layer 2744. In these systems, the application/module "logic" can be separated from the aspects of the application/module that interact with the user.

Some software architectures utilize virtual machines. In the example of FIG. 27, this is illustrated by a virtual machine 2748. The virtual machine 2748 creates a software environment where applications/modules can execute as if they were executing on a hardware machine (e.g., the machine 2800 of FIG. 28). The virtual machine 2748 is hosted by a host operating system (e.g., the operating system 2714) and typically, although not always, has a virtual machine monitor 2746, which manages the operation of the virtual machine 2748 as well as the interface with the host operating system (e.g., the operating system 2714). A software architecture executes within the virtual machine 2748, such as an operating system 2750, libraries 2752, frameworks/middleware 2754, applications 2756, or a presentation layer 2758. These layers of software architecture executing within the virtual machine 2748 can be the same as corresponding layers previously described or may be different.

FIG. 28 illustrates a diagrammatic representation of a machine 2800 in the form of a computer system within which a set of instructions may be executed for causing the machine 2800 to perform any one or more of the methodologies discussed herein, according to an embodiment. Specifically, FIG. 28 shows a diagrammatic representation of the machine 2800 in the example form of a computer system, within which instructions 2816 (e.g., software, a program, an application, an applet, an app, or other executable code) for causing the machine 2800 to perform any one or more of the methodologies discussed herein may be executed. For example, the instructions 2816 may cause the machine 2800 to execute any one of methods 200, 300 described above with respect to FIGS. 2 and 3. The instructions 2816 transform the general, non-programmed machine 2800 into a particular machine 2800 programmed to carry out the described and illustrated functions in the manner described. In alternative embodiments, the machine 2800 operates as a standalone device or may be coupled (e.g., networked) to other machines. In a networked deployment, the machine 2800 may operate in the capacity of a server machine or a client machine in a server-client network environment, or as a peer machine in a peer-to-peer (or distributed) network environment. The machine 2800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 2816, sequentially or otherwise, that specify actions to be taken by the machine 2800. Further, while only a single machine 2800 is illustrated, the term "machine" shall also be taken to include a collection of machines 2800 that individually or jointly execute the instructions 2816 to perform any one or more of the methodologies discussed herein.

The machine 2800 may include processors 2810, memory 2830, and I/O components 2850, which may be configured to communicate with each other such as via a bus 2802. In an embodiment, the processors 2810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2812 and a processor 2814 that may execute the instructions 2816. The term "processor" is intended to include multi-core processors that may comprise two or more independent processors (sometimes referred to as "cores") that may execute instructions contemporaneously. Although FIG. 28 shows multiple processors 2810, the machine 2800 may include a single processor with a single core, a single processor with multiple cores (e.g., a multi-core processor), multiple processors with a single core, multiple processors with multiples cores, or any combination thereof.

The memory 2830 may include a main memory 2832, a static memory 2834, and a storage unit 2836 including machine-readable medium 2838, each accessible to the processors 2810 such as via the bus 2802. The main memory 2832, the static memory 2834, and the storage unit 2836 store the instructions 2816 embodying any one or more of the methodologies or functions described herein. The instructions 2816 may also reside, completely or partially, within the main memory 2832, within the static memory 2834, within the storage unit 2836, within at least one of the processors 2810 (e.g., within the processor's cache memory), or any suitable combination thereof, during execution thereof by the machine 2800.

The I/O components 2850 may include a wide variety of components to receive input, provide output, produce output, transmit information, exchange information, capture measurements, and so on. The specific I/O components 2850 that are included in a particular machine will depend on the type of machine. For example, portable machines such as mobile phones will likely include a touch input device or other such input mechanisms, while a headless server machine will likely not include such a touch input device. It will be appreciated that the I/O components 2850 may include many other components that are not shown in FIG. 28. The I/O components 2850 are grouped according to functionality merely for simplifying the following discussion, and the grouping is in no way limiting. In various embodiments, the I/O components 2850 may include output components 2852 and input components 2854. The output components 2852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 2850 may include biometric components 2856, motion components 2858, environmental components 2860, or position components 2862, among a wide array of other components. For example, the biometric components 2856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2858 may include acceleration sensor components (e.g., accelerometer), gravitation sensor components, rotation sensor components (e.g., gyroscope), and so forth. The environmental components 2860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2850 may include communication components 2864 operable to couple the machine 2800 to a network 2880 or devices 2870 via a coupling 2882 and a coupling 2872, respectively. For example, the communication components 2864 may include a network interface component or another suitable device to interface with the network 2880. In further examples, the communication components 2864 may include wired communication components, wireless communication components, cellular communication components, near field communication (NFC) components, Bluetooth© components (e.g., Bluetooth© Low Energy), Wi-Fi© components, and other communication components to provide communication via other modalities. The devices 2870 may be another machine or any of a wide variety of peripheral devices (e.g., a peripheral device coupled via a USB).

Moreover, the communication components 2864 may detect identifiers or include components operable to detect identifiers. For example, the communication components 2864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2864, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 2800 including processors 2810), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 2800, but deployed across a number of machines 2800. In some example embodiments, the processors 2810 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 2830, 2832, 2834, and/or the memory of the processor(s) 2810) and/or the storage unit 2836 may store one or more sets of instructions 2816 and data structures (e.g., software) embodying or utilized by any one or more of the methodologies or functions described herein. These instructions (e.g., the instructions 2816), when executed by the processor(s) 2810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 2816 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 2880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2880 or a portion of the network 2880 may include a wireless or cellular network, and the coupling 2882 may be a Code Division Multiple Access (CDMA) connection, a Global System for Mobile communications (GSM) connection, or another type of cellular or wireless coupling. In this example, the coupling 2882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 2870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
   receiving, by a hardware processor, a first user request from a client device to generate a definition for a runbook that comprises a set of actions with respect to a set of external systems or services, in response to the first user request to
      causing, by the hardware processor, a graphical user interface, for defining the runbook, to be presented at the client device;
      receiving, by the hardware processor, information entered by a first user through the graphical user interface, the received information defining the set of actions for the runbook, the received information defining a set of trigger conditions that when satisfied causes generation of an individual instance of the runbook, at least one condition in the set of trigger conditions being based on input data provided by at least one external system or service; and
      generating, by the hardware processor, a stored definition of the runbook based on the received information;
   monitoring, by the hardware processor, when the set of trigger conditions is satisfied for the runbook;
   generating, by the hardware processor, a new instance of the runbook based on the stored definition in response to detecting that the set of trigger conditions is satisfied;
   receiving by the hardware processor, a second user request from the client device to access data for the new instance of the runbook;
   in response to the second user request sending to the client device an interactive electronic document for the new instance of the runbook, the interactive electronic document being generated based on the stored definition of the runbook, the interactive electronic document comprising
      presentation of a timeline of activities performed or observed in association with the new instance of the runbook, the activities of the timeline including information regarding execution of any action, in the set of actions, in association with the new instance of the runbook;
   receiving, by the hardware processor, a third user request from the client device to invoke at least one action, in the set of actions, with respect to an external system or service, the third user request being generated by a second user through the interactive electronic document; and in response to the third user request:
  causing, by the hardware processor, the at least one action to be executed with respect to the external system or service; and
  updating, by the hardware processor, the activities of the timeline of the interactive electronic document to present information regarding the at least one action that indicates that the at least one action was invoked through the interactive electronic document.

2. The method of claim 1, wherein in the set of actions, an individual action is configured to execute in response to satisfaction of an execution condition.

3. The method of claim 2, wherein the execution condition for the individual action is satisfied when a user input for the individual action is received through a copy of an interactive electronic document generated for the new instance of the runbook.

4. The method of claim 2, wherein the execution condition for the individual action is satisfied when the new instance of the runbook is generated.

5. The method of claim 1, wherein in the set of actions, an individual action is configured to cause execution of a next action in the set of actions in response to the individual action completing execution.

6. The method of claim 1, wherein the received information defines, in association with an individual action in the set of actions, a graphical element to be rendered as part of the interactive electronic document, the graphical element indicating a status of the individual action for the individual instance.

7. The method of claim 1, wherein in the set of actions, an individual action is configured to prompt the second user for input information when the individual action is executed for the individual instance, the input information defining a parameter for performing the individual action.

8. The method of claim 1, wherein the received information defines a prescribed order for executing the set of actions, the prescribed order determining a presentation order for presenting graphical elements associated with each action, in the set of actions, in the interactive electronic document.

9. The method of claim 1, wherein the interactive electronic document comprises content that is updated with information relating to operational activity data provided by the at least one external system or service.

10. The method of claim 1, comprising:
updating, by the hardware processor, stored data that describes the new instance of the runbook based on the causing of the at least one action to be executed with respect to the external system or service.

11. The method of claim 1, wherein the interactive electronic document comprises a set of graphical elements associated with each action in the set of actions.

12. The method of claim 1, comprising:
updating, by the hardware processor, stored data that describes the new instance of the runbook based on the input data, the updated stored data causing an update to a set of graphical elements rendered as part of the interactive electronic document.

13. The method of claim 1, wherein the input data describes an operational event for the at least one external system or service.

14. The method of claim 13, wherein the operational event comprises an alert generated by the at least one external system or service.

15. The method of claim 13, comprising:
accessing, by the hardware processor, the input data from log data generated by the at least one external system or service.

16. A non-transitory computer-readable medium comprising instructions that, when executed by a hardware processor of a device, cause the device to perform operations comprising:
receiving a first user request from a client device to access data for an instance of a runbook, the instance of the runbook being generated based on a stored definition for the runbook, the instance of the runbook being generated for an operational event for a set of external systems or services;
monitoring input data from at least one external system or service;
in response to the first user request to access data for the instance of the runbook, sending to the client device an interactive electronic document for the instance of the runbook, the interactive electronic document being generated based on the stored definition of the runbook the interactive electronic document comprising presentation of a timeline of activities performed or observed in association with the instance of the runbook, the activities of the timeline including: information regarding execution of any action in association with the instance of the runbook;
generating update data for the interactive electronic document based on the monitoring of the input data, the update data being configured to cause at least the activities of the timeline of the interactive electronic document based on the input data;
sending the update data to the client device;
receiving a second user request from the client device to invoke at least one action with respect to the external system or service, the at least one action presented by the interactive electronic document, the second user request being generated by a user through the interactive electronic document at the client device; and
in response to the second user request:
  causing the at least one action to be executed with respect to the external system or service; and
  updating the activities of the timeline of the interactive electronic document to present information regarding the at least one action that indicates that the at least one action was invoked through the interactive electronic document.

17. A system comprising:
a memory storing instructions; and
one or more hardware processors communicatively coupled to the memory and configured by the instructions to perform operations comprising:
  receiving a first user request from a client device to access data for an instance of a runbook, the instance of the runbook being generated based on a stored definition for the runbook, the instance of the runbook being generated for an operational event for a set of external systems or services;
  in response to the first user request, sending to the client device an interactive electronic document for the instance of the runbook, the interactive electronic document being generated based on the stored definition of the runbook, the interactive electronic document comprising presentation of a timeline of activities performed or observed in association with the instance of the runbook, the activities of the timeline including information regarding execution of any action in association with the instance of the runbook:

receiving a second user request from the client device to invoke at least one action with respect to an external system or service, the at least one action presented by the interactive electronic document, the second user request being generated by a user through the interactive electronic document at the client device; and in response to the second user request:

causing the at least one action to be executed with respect to the external system or service; and updating the activities of the timeline of the interactive electronic document to present information regarding the at least one action that indicates that the at least one action was invoked through the interactive electronic document.

18. The method of claim 1, wherein the information regarding the at least one action further indicates the at least one action was invoked through the interactive electronic document by the second user.

19. The non-transitory computer-readable medium of claim 16, wherein the information regarding the at least one action further indicates the at least one action was invoked through the interactive electronic document by the user.

20. The system of claim 17, wherein the information regarding the at least one action further indicates the at least one action was invoked through the interactive electronic document by the user.

* * * * *